(12) United States Patent
Palumbo et al.

(10) Patent No.: US 7,771,289 B2
(45) Date of Patent: *Aug. 10, 2010

(54) SPORTS ARTICLES FORMED USING NANOSTRUCTURED MATERIALS

(75) Inventors: Gino Palumbo, Toronto (CA); William F. Davidson, III, Huntington Beach, CA (US); Jonathan McCrea, Toronto (CA); Klaus Tomantschger, Mississauga (CA); Iain Brooks, Toronto (CA); Dave Limoges, Etobicoke (CA); Konstantinos Panagiotopoulos, Toronto (CA); Uwe Erb, Fraserville (CA)

(73) Assignee: Integran Technologies, Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/305,842

(22) Filed: Dec. 16, 2005

(65) Prior Publication Data

US 2006/0160636 A1      Jul. 20, 2006

Related U.S. Application Data

(63) Continuation-in-part of application No. 11/013,456, filed on Dec. 17, 2004, now Pat. No. 7,387,578.

(51) Int. Cl.
*A63B 53/04* (2006.01)
(52) U.S. Cl. .................................................. 473/324
(58) Field of Classification Search .................. 473/324
See application file for complete search history.

(56) References Cited

U.S. PATENT DOCUMENTS 2,961,395 A    11/1960   Texi
3,061,525 A  * 10/1962   Grazen ........................ 205/67
3,655,433 A    4/1972    Poppe et al.
3,806,429 A    4/1974    Clauss et al.
3,812,566 A  * 5/1974    Clauss ........................ 428/613
3,867,264 A    2/1975    Carson (Continued)

FOREIGN PATENT DOCUMENTS

EP         0341643      *  9/1989

(Continued)

OTHER PUBLICATIONS

Shriram S. et al., "Electrodeposition of Nanocrystalline Nickel—A Brief Review" Transactions of the Institute of Metal Finishing, Institute of Metal Finishing, London, GB, vol. 78, No. 5, Sep. 2000, pp. 194-197, XP000966650 ISSN: 0020-2967.

(Continued)

*Primary Examiner*—Stephen L. Blau
(74) *Attorney, Agent, or Firm*—Fay Sharpe LLP

(57) ABSTRACT

A sports article includes a portion that includes a nanostructured material. The nanostructured material includes a metal, and the nanostructured material has an average grain size that is in the range of 2 nm to 5,000 nm, a yield strength that is in the range of 200 MPa to 2,750 MPa, and a hardness that is in the range of 100 Vickers to 2,000 Vickers. The sports article can be any of a variety of sports equipment and associated components, such as a golf club, a baseball bat, a softball bat, a lacrosse stick, or a hockey stick.

17 Claims, 7 Drawing Sheets

U.S. PATENT DOCUMENTS

| | | | |
|---|---|---|---|
| 3,949,988 A | 4/1976 | Staufer | |
| 3,974,044 A | 8/1976 | Tremmel | |
| 4,084,819 A | 4/1978 | Van Auken | |
| 4,124,208 A | 11/1978 | Burns | |
| 4,179,343 A | 12/1979 | Tremmel | |
| 4,188,032 A * | 2/1980 | Yanagioka | 473/320 |
| 4,279,707 A * | 7/1981 | Anderson et al. | 205/148 |
| 4,319,750 A | 3/1982 | Roy | |
| 4,427,034 A * | 1/1984 | Nagata et al. | 138/145 |
| 4,461,680 A | 7/1984 | Lashmore | |
| 4,533,146 A | 8/1985 | Schaar | |
| 4,556,607 A * | 12/1985 | Sastri | 428/627 |
| 4,951,953 A | 8/1990 | Kim | |
| 5,028,464 A | 7/1991 | Shigetoh | |
| RE33,767 E | 12/1991 | Christini et al. | |
| 5,131,986 A | 7/1992 | Harada et al. | |
| 5,207,427 A | 5/1993 | Saeki | |
| 5,320,386 A | 6/1994 | Harmala et al. | |
| 5,324,032 A | 6/1994 | Minami | |
| 5,352,266 A | 10/1994 | Erb et al. | |
| 5,433,797 A * | 7/1995 | Erb et al. | 148/304 |
| 5,437,450 A | 8/1995 | Akatsuka et al. | |
| 5,472,202 A | 12/1995 | Yamanaka | |
| 5,496,463 A | 3/1996 | Mori et al. | |
| 5,516,415 A * | 5/1996 | Palumbo et al. | 205/73 |
| 5,538,769 A | 7/1996 | Sandman, Jr. | |
| 5,599,242 A | 2/1997 | Solviche et al. | |
| 5,603,667 A | 2/1997 | Ezaki et al. | |
| 5,647,919 A | 7/1997 | Kita et al. | |
| 5,655,981 A | 8/1997 | Reed | |
| 5,665,441 A | 9/1997 | Suzue et al. | |
| 5,686,155 A | 11/1997 | Suzue et al. | |
| 5,713,800 A | 2/1998 | Su | |
| 5,755,826 A | 5/1998 | Beach et al. | |
| 5,851,158 A * | 12/1998 | Winrow et al. | 473/330 |
| 5,935,018 A | 8/1999 | Takeda | |
| 5,967,904 A * | 10/1999 | Nagai et al. | 473/345 |
| 6,030,851 A | 2/2000 | Grandmont et al. | |
| 6,080,504 A | 6/2000 | Taylor et al. | |
| 6,106,417 A | 8/2000 | Umlauft et al. | |
| 6,139,444 A | 10/2000 | Renard et al. | |
| 6,193,614 B1 | 2/2001 | Sasamoto et al. | |
| 6,334,824 B1 | 1/2002 | Fillece et al. | |
| 6,346,052 B1 | 2/2002 | Chappell | |
| 6,354,960 B1 | 3/2002 | Perryman et al. | |
| 6,355,340 B1 | 3/2002 | Singh et al. | |
| 6,402,860 B2 * | 6/2002 | Hashikura et al. | 148/440 |
| 6,468,672 B1 | 10/2002 | Donovan, III et al. | |
| 6,509,107 B2 | 1/2003 | Ding et al. | |
| 6,582,320 B2 | 6/2003 | Fendel | |
| 6,638,577 B2 * | 10/2003 | Sano et al. | 427/475 |
| 6,679,788 B1 * | 1/2004 | Heinrich et al. | 473/324 |
| 6,692,377 B2 | 2/2004 | Galloway | |
| 6,729,970 B2 | 5/2004 | Horwood et al. | |
| 6,805,642 B2 | 10/2004 | Meyer | |
| 6,827,796 B2 * | 12/2004 | Holzl et al. | 148/527 |
| 6,860,821 B2 | 3/2005 | Unosawa et al. | |
| 6,869,372 B1 | 3/2005 | Higginbotham et al. | |
| 6,908,401 B2 | 6/2005 | Cheng | |
| 2001/0051549 A1 | 12/2001 | Inoue et al. | |
| 2002/0034985 A1 | 3/2002 | Perryman et al. | |
| 2002/0061374 A1 * | 5/2002 | O'Brien et al. | 428/36.9 |
| 2002/0082111 A1 | 6/2002 | Hedrick et al. | |
| 2002/0098906 A1 * | 7/2002 | Hsu | 473/316 |
| 2002/0119829 A1 | 8/2002 | Cheng | |
| 2004/0043825 A1 | 3/2004 | Horwood et al. | |
| 2004/0055675 A1 | 3/2004 | Kuramoto et al. | |
| 2004/0092329 A1 | 5/2004 | Meyer | |
| 2004/0092330 A1 * | 5/2004 | Meyer et al. | 473/318 |
| 2004/0121864 A1 | 6/2004 | Morrow et al. | |
| 2004/0147346 A1 | 7/2004 | Casasanta | |
| 2004/0209704 A1 * | 10/2004 | Mahaffey | 473/345 |
| 2004/0244888 A1 | 12/2004 | Horimura et al. | |
| 2004/0256236 A1 | 12/2004 | Minevski et al. | |
| 2005/0103408 A1 * | 5/2005 | Kuehmann et al. | 148/608 |
| 2005/0107182 A1 | 5/2005 | Meyer et al. | |
| 2005/0124433 A1 * | 6/2005 | Scruggs et al. | 473/316 |
| 2005/0161103 A1 | 7/2005 | Lindsay | |
| 2006/0160636 A1 | 7/2006 | Palumbo et al. | |
| 2006/0193742 A1 * | 8/2006 | Miura et al. | 419/52 |

FOREIGN PATENT DOCUMENTS

| | | |
|---|---|---|
| JP | 57-171691 | 10/1982 |
| JP | 6-292745 * | 10/1994 |
| JP | 9-266967 * | 10/1997 |
| JP | 09285568 | 11/1997 |
| JP | 09285569 | 11/1997 |
| WO | WO 04/001100 A1 | 12/2003 |
| WO | WO 04/001102 A1 | 12/2003 |
| WO | WO2004/074550 | 9/2004 |
| WO | WO 2004/092450 A1 | 10/2004 |
| WO | WO2004/094669 | 11/2004 |

OTHER PUBLICATIONS

Gyftou, P. et al., "Electrodeposition of NI/SIC Composites by Pulse Electrolysis" Transactions of the Institute of Metal Finishing, Institute of Metal Finishing, London, GB, vol. 80, No. 3, May 2002, pp. 88-91, XP001122455 ISSN; 0020-2967.

A. Gurga, et al. "Nanoindentation Study of the Effect of Nanodiamond additives on Electroless Deposition Nickel-Boride Coating," Azojomo Journal of Materials Online, OARS, Oct. 2006, vol. 2, pp. 1-9.

P. Sharma et al., "On the Grain-Size-Dependent Elastic Modulus of Nanocrystalline Materials With and Without Grain-Boundary Sliding," 2003 Materials Research Society, J. Mater. Res., vol. 18, No. 8, Aug. 2003, pp. 1823-1826.

* cited by examiner

SPORTS ARTICLES FORMED USING NANOSTRUCTURED MATERIALS

CROSS-REFERENCE TO RELATED APPLICATION

This patent application is a continuation-in-part of the patent application of Palumbo et al., U.S. patent application Ser. No. 11/013,456, entitled "Strong, Lightweight Article Containing a Fine-Grained Metallic Layer" and filed on Dec. 17, 2004, now U.S. Pat. No. 7,387,578 the disclosure of which is incorporated herein by reference in its entirety.

FIELD OF THE INVENTION

The invention generally relates to sports articles. For example, sports articles formed using nanostructured materials are described herein.

BACKGROUND OF THE INVENTION

Due to the competitive nature of many sports, players are often seeking ways to improve sports equipment. Along this regard, manufacturers have sought out different materials and designs to enhance sports equipment. As can be appreciated, finding a suitable combination of materials and designs to meet a set of performance criteria is a challenging task.

For example, baseball bats were initially made of wood. Over the years, baseball bats that are made of a metal, such as aluminum, gained popularity with respect to wood baseball bats. Metal baseball bats can provide a number of benefits with respect to wood baseball bats, including longer hitting distances and greater durability. At the same time, however, metal baseball bats can suffer from a number of deficiencies. In particular, a metal baseball bat can transmit unpleasant vibrations into the hands and arms of a player. Also, unlike a wood baseball bat, a metal baseball bat can emit a high-pitched metallic sound upon impact. Attempts have been made to address the deficiencies of metal baseball bats. In particular, some of these attempts involve multi-layered or multi-walled designs using different materials, such as metals, polymers, and composites. While providing some benefits, these attempts can still be lacking in terms of hitting distance and durability as well as in terms of feel and sound upon impact. Moreover, some of these attempts can involve manufacturing techniques that are inefficient in terms of cost and time.

It is against this background that a need arose to develop the sports articles described herein.

SUMMARY OF THE INVENTION

In one aspect, the invention relates to a sports article. The sports article can be any of a variety of sports equipment and associated components, such as a golf club shaft, a golf club head, a baseball bat, a softball bat, a lacrosse stick, or a hockey stick.

In one embodiment, the sports article includes a portion that includes a nanostructured material. The nanostructured material includes a metal, and the nanostructured material has an average grain size that is in the range of 2 nm to 5,000 nm, a yield strength that is in the range of 200 MegaPascal ("MPa") to 2,750 MPa, and a hardness that is in the range of 100 Vickers to 2,000 Vickers.

In another embodiment, the sports article includes an electrodeposited or electroformed fine-grained metal or metal alloy coating having a thickness between 30 micrometer ("μm") and 5 millimeter ("mm") and up to 5 centimeter ("cm"). The coating exhibits a resilience of at least 0.25 MPa and up to 25 MPa and an elastic strain limit of at least 0.75% and up to 2.00%.

In another embodiment, the sports article includes a graphite/metal composite shaft, tube, or the like incorporating a metallic coating representing at least 5%, such as more than 10% or more than 20%, and up to 75%, 85%, or 95% of a total weight on a polymer substrate optionally containing graphite/carbon fibers. A torsional stiffness per unit weight of the sports article containing the metallic coating is improved by at least about 5% when compared to a torsional stiffness of a similar sports article not containing the metallic coating.

In another embodiment, the sports article includes a portion that includes a first layer and a second layer adjacent to the first layer. At least one of the first layer and the second layer includes a nanostructured material that has a grain size in the submicron range, such as in the nanometer range. Nanostructured materials can be formed as high-strength coating of pure metals, alloys of metals selected from the group of Ag, Au, Co, Cu, Cr, Fe, Ni, Sn, Fe, Pt and Zn and alloying elements selected from the group of Mo, W, B, C, P, S, and Si, and metal matrix composites of pure metals or alloys with particulate additives, such as powders, fibers, nanotubes, flakes, metal powders, metal alloy powders, and metal oxide powders of Al, Co, Cu, In, Mg, Ni, Si, Sn, V, and Zn; nitrides of Al, B and Si; C (e.g., graphite, diamond, nanotubes, Buckminster Fullerenes); carbides of B, Cr, Bi, Si, and W; and self-lubricating materials such as $MoS_2$ or organic materials such as PTFE. An improved process can be employed to create high strength, equiaxed coatings on metallic components or on non-conductive components that have been metallized to render them suitable for electroplating. In an alternative embodiment, the process can be used to electroform a stand-alone article on a mandrel or other suitable substrate and, after reaching a desired plating thickness, to remove the free-standing electroformed article from the temporary substrate.

In another aspect, the invention relates to an improved process for producing sports articles. In one embodiment, the process includes: (a) positioning a metallic or metallized work piece or a reusable mandrel/temporary substrate to be plated in a plating tank containing a suitable electrolyte; (b) providing electrical connections to the work piece and to one or several anodes; and (c) forming and electrodepositing a metallic material with an average grain size of less than 1,000 nanometer ("nm") on at least part of the surface of the work piece using a suitable DC or pulse electrodeposition process, such as described in the copending application, PCT Publication No. WO 2004/001100 A1, the disclosure of which is incorporated herein by reference in its entirety.

In the process of an embodiment of the invention, an electrodeposited metallic coatings optionally contains at least 2.5% by volume particulate, such as at least 5%, and up to 75% by volume particulate. The particulate can be selected from the group of metal powders, metal alloy powders, and metal oxide powders of Al, Co, Cu, In, Mg, Ni, Si, Sn, V, and Zn; nitrides of Al, B and Si; C (e.g., graphite or diamond); carbides of B, Cr, Si, and W; $MoS_2$; and organic materials such as PTFE and other polymeric materials. The particulate average particle size is typically below 10,000 nm (or 10 μm), such as below 5,000 nm (or 5 μm), below 1,000 nm (or 1 μm), or below 500 nm.

The following list describes suitable operating parameter ranges and nanostructured material properties according to an embodiment of the invention:

Nanostructured Material Properties:

| | |
|---|---|
| Nanostructured Average Grain Size Minimum: | 2 nm; 4 nm; 10 nm |
| Nanostructured Average Grain Size Maximum: | 100 nm; 500 nm, 1,000 nm; 5,000 nm |
| Minimum Ratio Coating Thickness to Grain Size: | 6; 25; 100; 1,000 |
| Maximum Ratio Coating Thickness to Grain Size: | 10,000; 100,000; 1,250,000; 12,500,000; 25,000,000 |
| Minimum Yield Strength: | 200 MPa; 400 MPa; 500 MPa |
| Maximum Yield Strength: | 2,000 MPa; 2750 MPa; 3500 MPa |
| Minimum Resilience of the Nanostructured Layer: | 0.25 MPa; 1 MPa; 2 MPa; 5 MPa; 7 MPa |
| Maximum Resilience of the Nanostructured Layer: | 12 MPa; 25 MPa |
| Elastic Limit Range: | 0.75%-2.00% |
| Particulate Content Range: | 2.5% to 75% by Volume |
| Nanostructured Metallic Layer Thickness Minimum: | 30 μm |
| Nanostructured Metallic Layer Thickness Maximum: | 5 mm; 1 cm; 5 cm |

Operating Parameters:

| | |
|---|---|
| Nanostructured Material Deposition Rate Range: | 10-500 μm/hr |
| Duty Cycle Range: | 5 to 100% |
| Deposition Temperature Range: | 10° C. to 100° C. |

In the process of an embodiment of the invention, dispersion strengthening of nanostructured materials is performed by a subsequent heat-treatment.

An embodiment of the invention provides for electrodeposited fine-grained layers, having a thickness of at least 0.030 mm, such as more than 0.05 mm or more than 0.1 mm, on surfaces of appropriate articles, including golf club heads, inserts for golf club heads, face plates for golf clubs, shafts for golf clubs, hockey sticks, hiking and skiing poles, baseball bats, arrows, and so forth, and coatings for complex shapes, including baseball bats, skate blades, snow boards, and tennis rackets.

Electrodeposited nanostructured materials of an embodiment of the invention have an average grain size under 5 μm (or 5,000 nm), such as in the range of 4 nm to 750 nm, in the range of 10 nm to 500 nm, or in the range of 15 nm to 300 nm.

Nanostructured materials of an embodiment of the invention have a resilience of at least 0.25 MPa, such as at least 1 MPa, at least 2 MPa, at least 5 MPa, or at least 7 MPa, and up to 25 MPa.

Nanostructured materials of an embodiment of the invention have an elastic limit of at least about 0.75%, such as greater than about 1.0% or greater than 1.5%, and up to 2.00%.

To ensure part reliability according to an embodiment of the invention, it can be desirable to maintain an average thickness to average grain size ratio of a nanostructured material layer at a minimum value of 6, such as greater than 25, greater than 500, or greater than 1,000, and up to 1,250,000 and as much as 12,500,000 or 25,000,000.

According to an embodiment of the invention, patches or sections of nanostructured materials can be formed on selected areas, such as on golf club face plates or sections of golf club shafts, bats, racquets, frames for bicycles, and the like, without the need to coat an entire article.

According to an embodiment of the invention, patches or sleeves of nanostructured materials, which need not be uniform in thickness, can be electrodeposited in order to, for example, form a thicker coating on selected sections or sections particularly prone to heavy use, such as on golf club face plates, a tip end of fishing poles, and shafts for golf clubs, skiing or hiking poles, and the like.

Other aspects and embodiments of the invention are also contemplated. For example, another aspect of the invention relates to a method of forming a sports article. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Overview

Figure 1A:
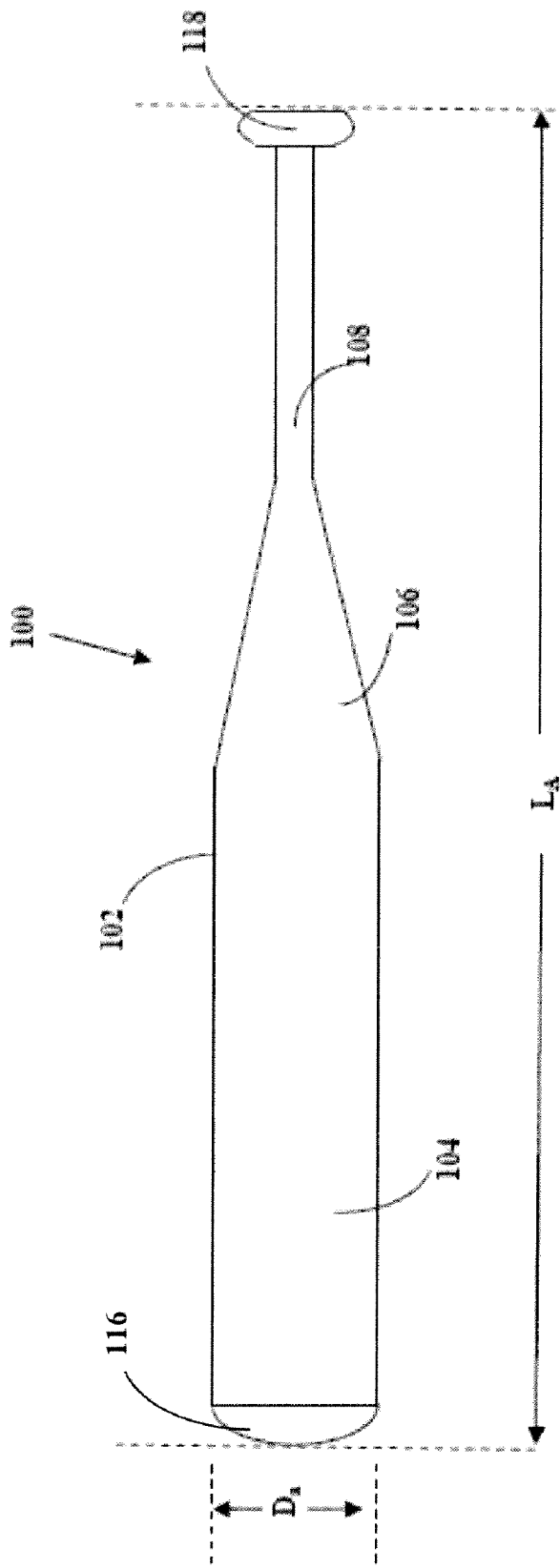
FIG. 1A and FIG. 1B illustrate a sports article implemented in accordance with an embodiment of the invention.

Embodiments of the invention relate to sports articles. Sports articles in accordance with various embodiments of the invention can be formed using nanostructured materials having a number of desirable characteristics. In particular, the nanostructured materials can exhibit characteristics such as high strength, high strength-to-weight ratio, high resilience, high fracture toughness, high elasticity, high vibration damping, high hardness, high ductility, high wear resistance, high corrosion resistance, and low friction. In such manner, the sports articles can have improved performance characteristics while being formed in a cost-effective manner. Examples of the sports articles include a variety of sports equipment and associated components, such as golf club heads, golf face plates, golf iron inserts, golf putter inserts, golf wedge inserts, golf shafts, baseball bats, softball bats, lacrosse sticks, hockey sticks, hockey stick blades, hockey skate frames, hockey skate blades, tennis rackets, squash rackets, racquetball rackets, paddle ball rackets, badminton rackets, yacht masts, sailing booms, boating cleats, fishing reels, fishing tackles, fishing poles, alpine skis, cross-country skis, nordic skis, ski bindings, snowboard bindings, water skis, snowboards, surfboards, ski poles, hiking poles, hiking gear, climbing gear, mountaineering gear, archery broadheads, archery shafts, diving tanks, diving regulators, bicycle frames, bicycle seat posts, bicycle linkage systems, bicycle handle bars, bicycle drive chains, bicycle front forks, bicycle disc brakes, bicycle wheels, bicycle spokes, helmets, gloves, shin guards, elbow pads, and shoulder pads.

DEFINITIONS

The following definitions apply to some of the features described with respect to some embodiments of the invention. These definitions may likewise be expanded upon herein.

As used herein, the singular terms "a," "an," and "the" include plural referents unless the context clearly dictates otherwise. Thus, for example, a reference to an object can include multiple objects unless the context clearly dictates otherwise.

As used herein, the term "set" refers to a collection of one or more items. Thus, for example, a set of objects can include a single object or multiple objects. Items included in a set can also be referred to as members of the set. Items included in a set can be the same or different. In some instances, items included in a set can share one or more common characteristics.

As used herein, the term "adjacent" refers to being near or adjoining. Objects that are adjacent can be spaced apart from one another or can be in actual or direct contact with one another. In some instances, objects that are adjacent can be coupled to one another or can be formed integrally with one another.

As used herein, the terms "integral" and "integrally" refer to a non-discrete portion of an object. Thus, for example, a hockey stick including a shaft portion and a blade portion that is formed integrally with the shaft portion can refer to an implementation of the hockey stick in which the shaft portion and the blade portion are formed as a monolithic unit. An integrally formed portion of an object can differ from one that is coupled to the object, since the integrally formed portion of the object typically does not form an interface with a remaining portion of the object.

As used herein, the term "submicron range" refers to a range of dimensions less than about 1,000 nm, such as from about 2 nm to about 900 nm, from about 2 nm to about 750 nm, from about 2 nm to about 500 nm, from about 2 nm to about 300 nm, from about 2 nm to about 100 nm, from about 10 nm to about 50 nm, or from about 10 nm to about 25 nm.

As used herein, the term "nanometer range" or "nm range" refers to a range of dimensions from about 1 nm to about 100 nm, such as from about 2 nm to about 100 nm, from about 10 nm to about 50 nm, or from about 10 nm to about 25 nm.

As used herein, the term "size" refers to a characteristic dimension of an object. Thus, for example, a size of an object that is a spherical can refer to a diameter of the object. In the case of an object that is non-spherical, a size of the object can refer to an average of various dimensions of the object. Thus, for example, a size of an object that is a spheroidal can refer to an average of a major axis and a minor axis of the object. When referring to a set of objects as having a specific size, it is contemplated that the objects can have a distribution of sizes around the specific size. Thus, as used herein, a size of a set of objects can refer to a typical size of a distribution of sizes, such as an average size, a median size, or a peak size.

As used herein, the term "grain size" refers to a size of a set of constituents or components included in a material, such as a nanostructured material. When referring to a material as being "fine-grained," it is contemplated that the material can have an average grain size in the submicron range, such as in the nm range.

As used herein, the term "microstructure" refers to a microscopic configuration of a material. An example of a microstructure is one that is quasi-isotropic in which a set of crystals are relatively uniform in shape and size and exhibit a relatively uniform grain boundary orientation. Another example of a microstructure is one that is anisotropic in which a set of crystals exhibit relatively large deviations in terms of shape, size, grain boundary orientation, texture, or a combination thereof.

Nanostructured Materials

Certain embodiments of the invention relate to nanostructured materials that can be used for sports applications. A microstructure and resulting characteristics of nanostructured materials can be engineered to meet performance criteria for a variety of sports articles. In some instances, engineering of nanostructured materials can involve enhancing or optimizing a set of characteristics, such as strength, strength-to-weight ratio, resilience, fracture toughness, vibration damping, hardness, ductility, and wear resistance. In other instances, engineering of nanostructured materials can involve trade-offs between different characteristics.

According to some embodiments of the invention, a nanostructured material has a relatively high density of grain boundaries as compared with other types of materials. This high density of grain boundaries can translate into a relatively large percentage of atoms that are adjacent to grain boundaries. In some instances, up to about 50 percent or more of the atoms can be adjacent to grain boundaries. Without wishing to be bound by a particular theory, it is believed that this high density of grain boundaries promotes a number of desirable characteristics in accordance with the Hall-Petch Effect. In order to achieve this high density of grain boundaries, the nanostructured material is typically formed with a relatively small grain size. Thus, for example, the nanostructured material can be formed with a grain size in the submicron range, such as in the nm range. As the grain size is reduced, a number of characteristics of the nanostructured material can be enhanced. For example, in the case of nickel, its hardness can increase from about 140 Vickers for a grain size greater than about 5 μm to about 300 Vickers for a grain size of about 100 nm and ultimately to about 600 Vickers for a grain size of about 10 nm. Similarly, an ultimate tensile strength of nickel can increase from about 400 MPa for a grain size greater than about 5 μm to 1,000 MPa for a grain size of about 100 nm and ultimately to over 2,000 MPa for a grain size of about 10 nm.

According to some embodiments of the invention, a nanostructured material includes a set of crystals that have a size in the nm range and, thus, can be referred to as a nanocrystalline material. However, as described herein, nanostructured materials having desirable characteristics can also be formed with larger grain sizes, such as in the submicron range. A microstructure of the nanostructured material can be engineered to cover a wide range of microstructure types, including one that is quasi-isotropic, one that is slightly-anisotropic, and one that is anisotropic and highly textured. Within this range of microstructure types, a reduction in size of the set of crystals can be used to promote a number of desirable characteristics.

Particularly useful nanostructured materials include those that exhibit a set of desirable characteristics, such as high strength, high strength-to-weight ratio, high resilience (e.g., defined as $R=\sigma^2/2E$), high fracture toughness, high elasticity, high vibration damping, high hardness, high ductility, high wear resistance, and low friction. For example, in terms of strength, particularly useful nanostructured materials include those having a yield strength that is at least about 200 MPa, such as at least about 500 MPa, at least about 1,000 MPa, or at least about 1,500 MPa, and up to about 2,750 MPa, such as up to about 2,500 MPa. In terms of resilience, particularly useful nanostructured materials include those having a modulus of resilience that is at least about 0.25 MPa, such as at least about 1 MPa, at least about 2 MPa, at least about 5 MPa, or at least about 7 MPa, and up to about 25 MPa, such as up to about 12 MPa. In terms of elasticity, particularly useful nanostructured materials include those having an elastic limit that is at least about 0.75 percent, such as at least about 1 percent or at least about 1.5 percent, and up to about 2 percent. In terms of hardness, particularly useful nanostructured materials include those having a hardness that is at least about 100 Vickers, such as at least about 300 Vickers, at least about 400 Vickers, or at least about 500 Vickers, and up to about 2,000 Vickers, such as up to about 1,000 Vickers, up to about 800 Vickers, or up to about 600 Vickers. In terms of ductility, particularly useful nanostructured materials include those having a tensile strain-to-failure that is at least about 1 percent, such as at least about 3 percent or at least about 5 percent, and up to about 15 percent, such as up to about 10 percent or up to about 7 percent.

Nanostructured materials according to various embodiments of the invention can be formed of a variety of materials. Particularly useful materials include: (1) metals selected from the group of Ag, Au, Cd, Co, Cr, Cu, Fe, Ir, Ni, Pb, Pd, Pt, Rh, Sn, and Zn; (2) metal alloys formed of these metals; and (3) metal alloys formed of these metals along with an alloying component selected from the group of B, C, Mn, Mo, P, S, Si, and W.

In some instances, a nanostructured material can be formed as a metal matrix composite in which a metal or a metal alloy forms a matrix within which a set of additives are dispersed. A variety of additives can be used, and the selection of a specific additive can be dependent upon a variety of considerations, such as its ability to facilitate formation of the nanostructured material and its ability to enhance characteristics of the nanostructured material. Particularly useful additives include particulate additives formed of: (1) metals selected from the group of Al, Co, Cu, In, Mg, Ni, Sn, V, and Zn; (2) metal alloys formed of these metals; (3) metal oxides formed of these metals; (4) nitrides of Al, B, and Si; (5) C, such as in the form of graphite, diamond, nanotubes, and Buckminster Fullerenes; (6) carbides of B, Bi, Cr, Si, and W; (7) self-lubricating materials, such as $MoS_2$; and (8) polymers, such as polytetrafluoroethylene ("PTFE"). During formation of a nanostructured material, a set of particulate additives can be added in the form of powders, fibers, or flakes that have a size in the submicron range, such as in the nm range. Depending on specific characteristics that are desired, the resulting nanostructured material can include an amount of particulate additives that is at least about 2.5 percent by volume, such as at least about 5 percent by volume, and up to about 75 percent by volume.

Table 1 below provides examples of classes of nanostructured materials that can be used to form sports articles described herein. Table 1 also sets forth specific characteristics that are particularly enhanced for these classes of nanostructured materials. As used below and subsequently herein, the notation "n-$X_1$" refers to a nanostructured material formed of material $X_1$, and the notation "n-$X_1$ $X_2$" refers to a nanostructured material formed of an alloy of material $X_1$ and material $X_2$.

TABLE 1

| Nanostructured Materials | Characteristics |
| --- | --- |
| n-Ni, n-Ni Co, and n-Ni Fe | high strength and high fracture toughness |
| n-Co P, n-Ni P, and $B_4C$/n-Ni P composites | high degree of hardness and high wear resistance |
| n-Cu | high strength |
| n-Zn, n-Zn Ni, n-Zn Fe $MoS_2$/n-Ni composites and $MoS_2$/n-Fe composites | high corrosion resistance low friction |
| n-Ag, n-Au, and n-Pt | high wear resistance and formed of precious metals |

Nanostructured materials can be formed using a variety of manufacturing techniques, such as sputtering, laser ablation, inert gas condensation, oven evaporation, spray conversion pyrolysis, flame hydrolysis, high energy milling, sol gel deposition, and electrodeposition. According to some embodiments of the invention, electrodeposition can be particularly desirable, since this manufacturing technique can be used to form nanostructured materials in a manner that is effective in terms of cost and time. Moreover, by adjusting electrodeposition settings, a microstructure of a nanostructured material can be controlled, thus allowing fine-tuned control and reproducibility of resulting characteristics of the nanostructured material.

Sports Articles

Figure 1B:
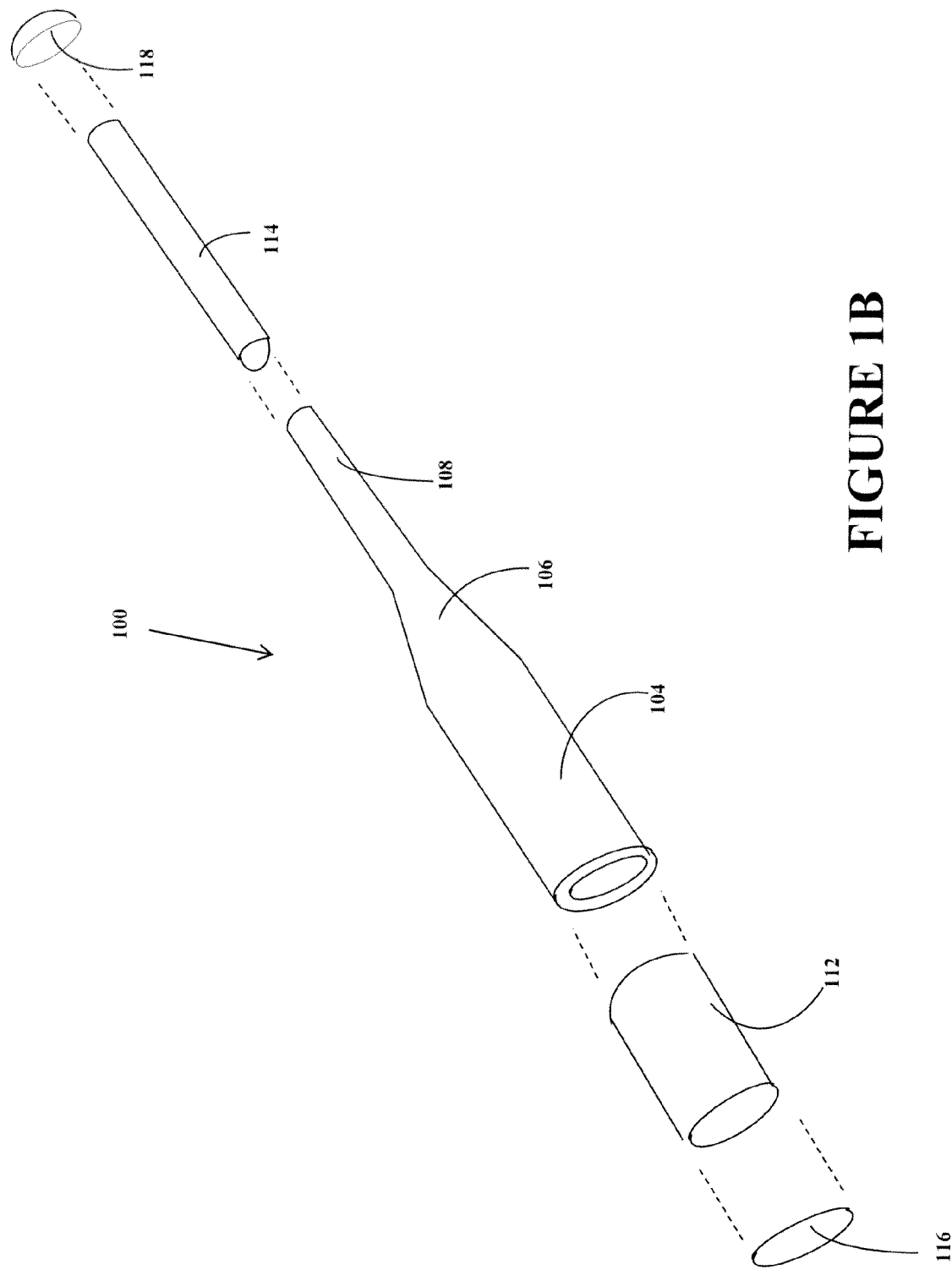

Attention first turns to FIG. 1A and FIG. 1B, which illustrate a sports article 100 implemented in accordance with an embodiment of the invention. In particular, FIG. 1A illustrates a side view of the sports article 100, while FIG. 1B illustrates an exploded, perspective view of certain portions of the sports article 100.

In the illustrated embodiment, the sports article 100 is implemented as a sports bat, such as a baseball bat or a softball bat. For certain implementations, the sports article 100 can comply with guidelines specified by a baseball governing body or a softball governing body, such as for a Youth Baseball League, a Senior Baseball League, an Adult Baseball League, a Fast-Pitch Softball League, or a Slow-Pitch Softball League (e.g., ASA., USSSA, or NCAA). Thus, for example, the sports article 100 can have a length $L_A$ that is in the range from about 71.1 cm (or about 28 inches) to about 81.3 cm (or about 32 inches) as specified for a Youth Baseball League or a Senior Baseball League, or in the range from about 78.7 cm (or about 31 inches) to about 86.4 cm (or about 34 inches) as specified for an Adult Baseball League. As another example, the sports article 100 can have an outer diameter $D_A$ that is about 5.7 cm (or about 2.25 inches), about 6.4 cm (or about 2.5 inches), or about 6.7 cm (or about 2⅝ inches). As a further example, the sports article 100 can exhibit an efficiency of energy transfer that is within a specified range. This efficiency of energy transfer can be specified in terms of, for example, a Ball Exit Speed Ratio ("BESR"), a Batted Ball Speed ("BBS"), or a Coefficient of Restitution ("COR"). It is also contemplated that the sports article 100 can be implemented as a batting-practice bat or a training bat and, thus, need not comply with any such guidelines.

Referring to FIG. 1A and FIG. 1B, the sports article 100 includes a body portion 102, which includes a barrel portion 104 and a handle portion 108. The body portion 102 also includes a tapered portion 106 that is positioned between and adjacent to the barrel portion 104 and the handle portion 108. In the illustrated embodiment, the barrel portion 104, the tapered portion 106, and the handle portion 108 are formed integrally with respect to one another. However, it is contemplated that these portions 104, 106, and 108 can be formed separately and can be coupled to one another using any suitable fastening mechanism. Referring to FIG. 1A and FIG. 1B, the body portion 102 has a cross-sectional shape that is substantially circular. However, it is contemplated that the body portion 102 can have any of a variety of other cross-sectional shapes.

In the illustrated embodiment, at least one of the barrel portion 104, the tapered portion 106, and the handle portion 108 is formed of a nanostructured material, which exhibits a set of desirable characteristics such as high strength, high strength-to-weight ratio, high resilience, high fracture toughness, high elasticity, high vibration damping, high hardness, high ductility, and high wear resistance. For certain implementations, the nanostructured material can form at least one layer of a multi-layered design. Thus, for example, at least one of the barrel portion 104, the tapered portion 106, and the handle portion 108 can include a set of layers, and at least one of the set of layers can be formed of the nanostructured material. A remaining layer of the set of layers can be formed of any suitable material, such as a fibrous material, a ceramic, a metal, a metal alloy, a polymer, or a composite. It is also contemplated that at least one of the barrel portion 104, the tapered portion 106, and the handle portion 108 can be substantially formed of the nanostructured material, such as in the case of an electroformed design.

Advantageously, the use of the nanostructured material within the body portion 102 allows the sports article 100 to exhibit improved performance characteristics while being formed in a cost-effective manner. Thus, for example, high resilience of the nanostructured material translates into an enhanced efficiency of energy transfer upon impact and longer hitting distances upon impact at various places along a hitting surface, rather than simply at an optimal location that is sometimes referred to as a "sweet spot" or a "center of percussion." In some instances, this efficiency of energy transfer can be tuned along the body portion 102 to comply with a limit imposed by a baseball governing body or a softball governing body. Also, high strength-to-weight ratio of the nanostructured material allows the sports article 100 to be strong yet lightweight, while high fracture toughness, high elasticity, high hardness, and high wear resistance of the nanostructured material allow the sports article 100 to be durable and to be less prone to buckling, cracks, scratches, and other structural damage. In addition, vibration damping and a desired sound upon impact are achieved when the nanostructured material is electro-deposited onto a suitable substrate, such as polymers or fiber-reinforced plastics (e.g., graphite/epoxy).

As illustrated in FIG. 1B, the body portion 102 defines an internal compartment 110 within which a pair of inserts 112 and 114 are positioned. In particular, the insert 112 is positioned adjacent to the barrel portion 104, while the insert 114 is positioned adjacent to the handle portion 108. The inserts 112 and 114 serve to enhance performance characteristics of the sports article 100, such as by providing enhanced balance and enhanced durability. In the illustrated embodiment, the inserts 112 and 114 are formed of a foam, such as a closed-cell foam or an open-cell foam.

Referring to FIG. 1A and FIG. 1B, the sports article 100 also includes a cap portion 116 and a knob portion 118, which are formed of any suitable materials such as fibrous materials, ceramics, metals, metal alloys, polymers, or composites. The cap portion 116 and the knob portion 118 are coupled to respective ends of the body portion 102 using any suitable fastening mechanism, thus sealing the inserts 112 and 114 within the body portion 102.

The use of specific materials and other specific implementation features can further enhance performance characteristics of the sports article 100. For example, an amount and a distribution of the nanostructured material can contribute to the performance characteristics of the sports article 100. It is contemplated that the nanostructured material can be distributed so as to selectively cover those portions of the sports article 100 that are likely to come into contact with a ball during use, thus providing an improved hitting surface for the sports article 100. In particular, the nanostructured material can form an outer layer of a multi-layered design and can be distributed so as to extend from the cap portion 116 up through the barrel portion 104 or up through the tapered portion 106. It is also contemplated that the nanostructured material can be distributed so as to selectively cover those portions of the sports article 100 that are likely to come into contact with a player's hands during use, such as the handle portion 108.

As another example, other portions of the sports article 100 can be formed of the same or a different nanostructured material. In particular, it is contemplated that at least one of the inserts 112 and 114 can be formed of a nanostructured material, which can form at least one layer of a foam design. It is also contemplated that at least one of the inserts 112 and 114 can be substantially formed of the nanostructured material. The use of the nanostructured material within the inserts 112 and 114 can allow the sports article 100 to exhibit improved performance characteristics, such as enhanced balance, enhanced efficiency of energy transfer upon impact, enhanced strength, enhanced durability, and desired feel and sound upon impact. Likewise, it is contemplated that at least one of the cap portion 116 and the knob portion 118 can be formed of a nanostructured material, which can form at least one layer of a multi-layered design. It is also contemplated that at least one of the cap portion 116 and the knob portion 118 can be substantially formed of the nanostructured material, such as in the case of an electroformed design. The use of the nanostructured material within the cap portion 116 and the knob portion 118 can allow the sports article 100 to exhibit improved performance characteristics, such as a desired weight, enhanced balance, enhanced durability, and enhanced coupling strength to the body portion 102. Also, the use of the nanostructured material within the cap portion 116 can alter a vibrational frequency response of the sports article 100, thus providing a desired feel upon impact.

Figure 2:
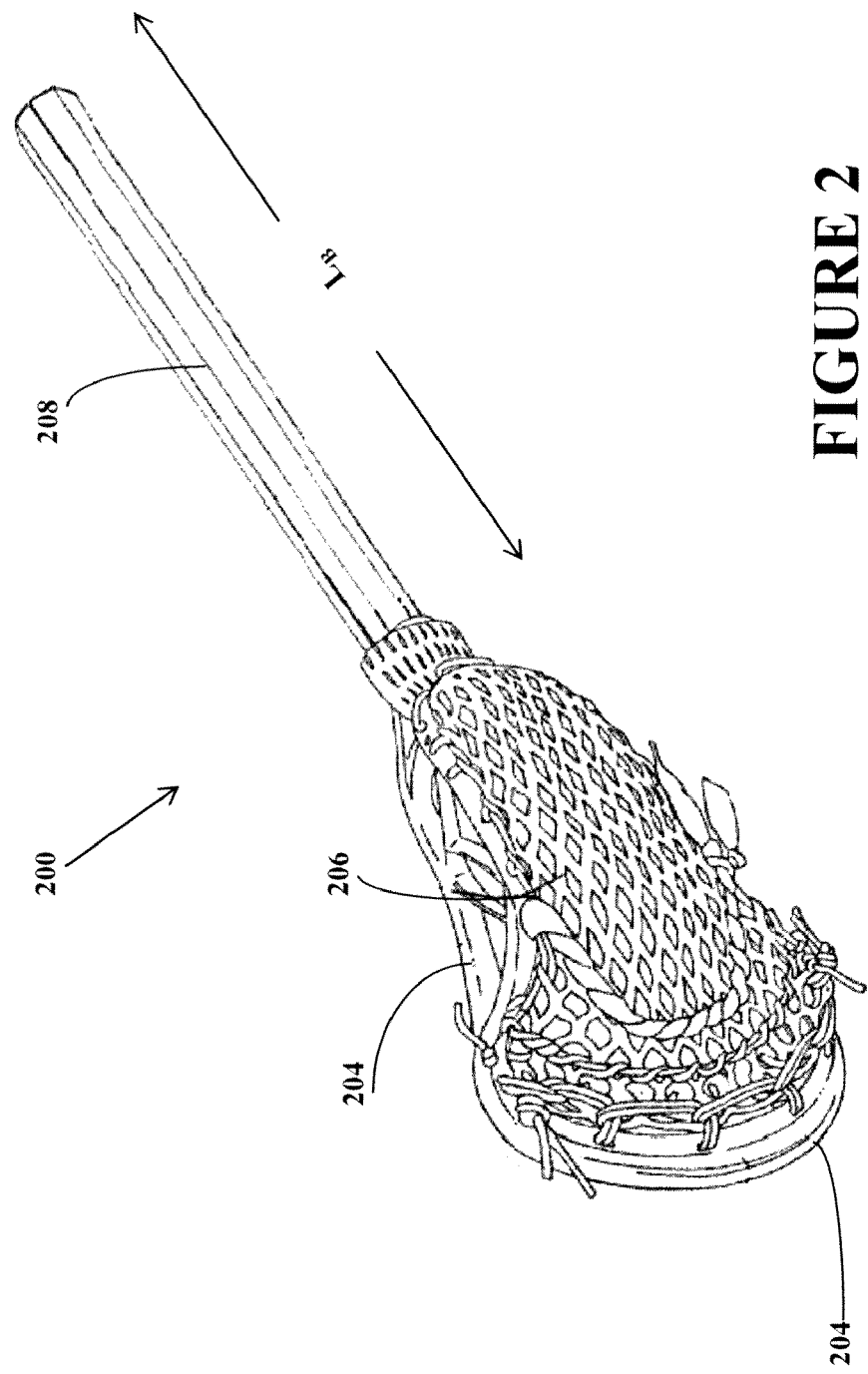
FIG. 2 illustrates a sports article implemented in accordance with another embodiment of the invention.

Attention next turns to FIG. 2, which illustrates a perspective view of a sports article 200 implemented in accordance with another embodiment of the invention. In the illustrated embodiment, the sports article 200 is implemented as a lacrosse stick. For certain implementations, the sports article 200 can comply with guidelines specified by a lacrosse governing body. Thus, for example, the sports article 200 can have dimensions and mass or weight characteristics that are within specified ranges. However, it is contemplated that the sports article 200 need not comply with any such guidelines.

Referring to FIG. 2, the sports article 200 includes a head portion 202, which includes a frame 204. The frame 204 is formed of any suitable material, such as a fibrous material, a ceramic, a metal, a metal alloy, a polymer, or a composite. The head portion 202 also includes a webbing 206, which is coupled to the frame 204 using any suitable fastening mechanism. The webbing 206 is formed of any suitable material, such as a fibrous material or a polymer.

As illustrated in FIG. 2, the sports article 200 also includes a handle portion 208 that is adjacent to the head portion 202. In the illustrated embodiment, the head portion 202 and the handle portion 208 are formed separately and are coupled to one another using any suitable fastening mechanism. However, it is contemplated that the head portion 202 and the handle portion 208 can be formed integrally with respect to one another. The handle portion 208 can have a length $L_B$ that depends on a specific use of the sports article 200. Thus, for example, the length $L_B$ can be about 76.2 cm (or about 30 inches) or about 81.3 cm (or about 32 inches) when used by an attack player, about 101.6 cm (or about 40 inches) when used by a goalie, or about 152.4 cm (or about 60 inches) when used by a defense player. Referring to FIG. 2, the handle portion 208 has a cross-sectional shape that is substantially octagonal. However, it is contemplated that the handle portion 208 can have any of a variety of other cross-sectional shapes, such as a hexagonal shape.

In the illustrated embodiment, the handle portion 208 is formed of a nanostructured material, which exhibits a set of desirable characteristics such as high strength, high strength-to-weight ratio, high resilience, high fracture toughness, high elasticity, high vibration damping, high degree of hardness, high ductility, and high wear resistance. For certain implementations, the nanostructured material can form at least one layer of a multi-layered design. A remaining layer of the multi-layered design can be formed of any suitable material, such as a fibrous material, a ceramic, a metal, a metal alloy, a polymer, or a composite. It is also contemplated that the handle portion 208 can be substantially formed of the nanostructured material, such as in the case of an electroformed design.

Advantageously, the use of the nanostructured material within the handle portion 208 allows the sports article 200 to exhibit improved performance characteristics while being formed in a cost-effective manner. Thus, for example, high strength-to-weight ratio of the nanostructured material allows the sports article 200 to be strong yet lightweight, while high fracture toughness, high elasticity, high hardness, and high wear resistance of the nanostructured material allow the sports article 200 to be durable and to be less prone to structural damage. In addition, vibration damping and a desired sound upon impact are achieved when the nanostructured material is electro-deposited onto a suitable substrate, such as polymers or fiber-reinforced plastics (e.g., graphite/epoxy).

The use of specific materials and other specific implementation features can further enhance performance characteristics of the sports article 200. For example, an amount and a distribution of the nanostructured material can contribute to the performance characteristics of the sports article 200. In particular, it is contemplated that the nanostructured material can be distributed so as to provide sufficient coverage of the handle portion 208, such as by extending substantially across the length $L_B$ of the handle portion 208. As another example, the head portion 202 can be formed of the same or a different nanostructured material. In particular, it is contemplated that at least one of the frame 204 and the webbing 206 can be formed of a nanostructured material, which can form at least one layer of a multi-layered design. It is also contemplated that the frame 204 can be substantially formed of the nanostructured material, such as in the case of an electroformed design. The use of the nanostructured material within the head portion 202 can allow the sports article 200 to exhibit improved performance characteristics, such as a desired weight, enhanced balance, enhanced durability, and enhanced coupling strength to the handle portion 208. Also, the use of the nanostructured material within the head portion 202 can alter a vibrational frequency response of the sports article 200, thus providing a desired feel upon impact.

Figure 3:
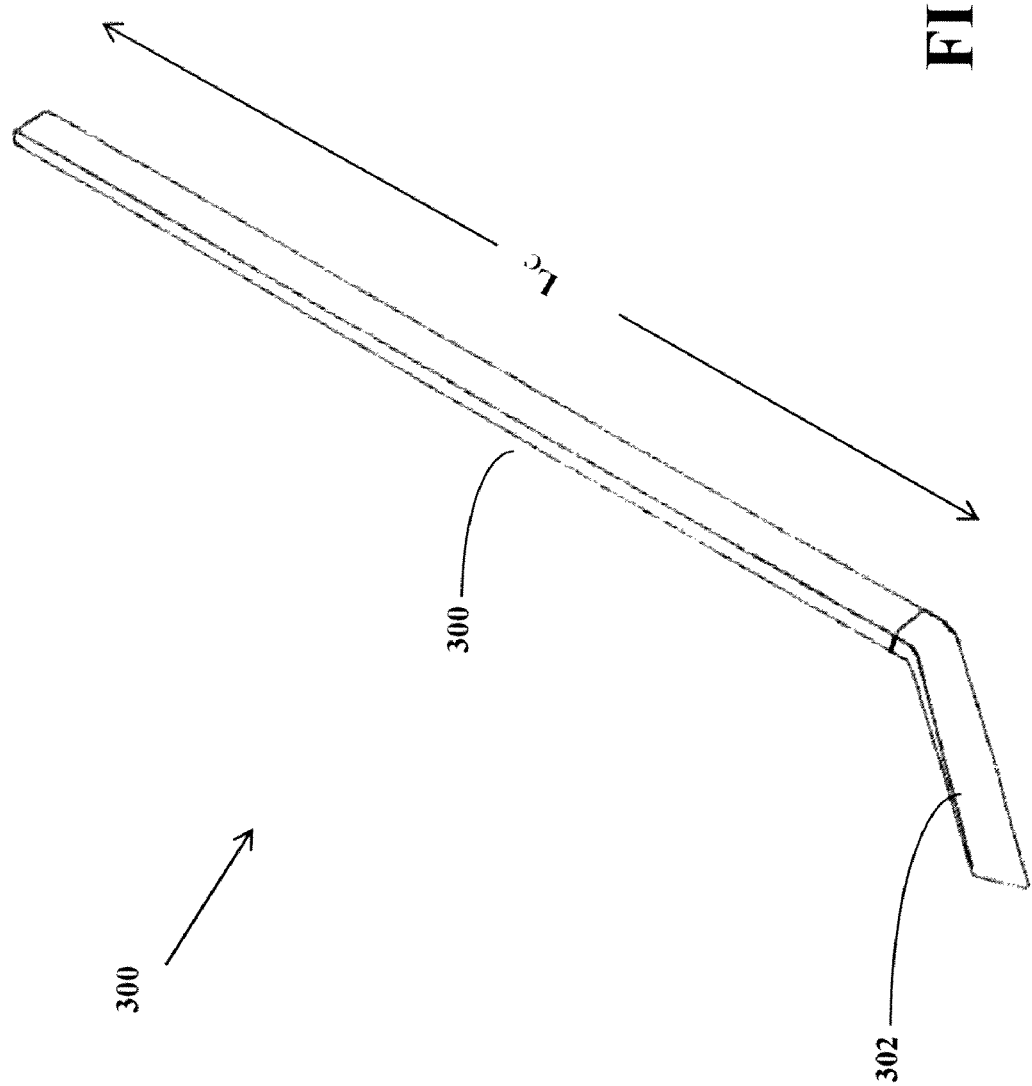
FIG. 3 illustrates a sports article implemented in accordance with a further embodiment of the invention.

FIG. 3 illustrates a sports article 300 implemented in accordance with a further embodiment of the invention. In the illustrated embodiment, the sports article 300 is implemented as a hockey stick. For certain implementations, the sports article 300 can comply with guidelines specified by a hockey governing body. Thus, for example, the sports article 300 can have dimensions, mass or weight characteristics, and an efficiency of energy transfer that are within specified ranges. However, it is contemplated that the sports article 300 need not comply with any such guidelines.

Referring to FIG. 3, the sports article 300 includes a blade portion 302, which is formed of any suitable material such as a fibrous material, a ceramic, a metal, a metal alloy, a polymer, or a composite. The sports article 300 also includes a shaft portion 304 that is adjacent to the blade portion 302. In the illustrated embodiment, the blade portion 302 and the shaft portion 304 are formed separately and are coupled to one another using any suitable fastening mechanism. However, it is contemplated that the blade portion 302 and the shaft portion 304 can be formed integrally with respect to one another. The shaft portion 304 can have a length $L_C$ that depends on a specific use of the sports article 300. Thus, for example, the length $L_C$ can differ depending on whether the sports article 300 is used by an attack player, a goalie, or a defense player. Referring to FIG. 3, the shaft portion 304 has a cross-sectional shape that is substantially rectangular. However, it is contemplated that the shaft portion 304 can have any of a variety of other cross-sectional shapes, such as a square shape.

In the illustrated embodiment, the shaft portion 304 is formed of a nanostructured material, which exhibits a set of desirable characteristics such as high strength, high strength-to-weight ratio, high resilience, high fracture toughness, high elasticity, high vibration damping, high hardness, high ductility, and high wear resistance. For certain implementations, the nanostructured material can form at least one layer of a multi-layered design. A remaining layer of the multi-layered design can be formed of any suitable material, such as a fibrous material, a ceramic, a metal, a metal alloy, a polymer, or a composite. It is also contemplated that the shaft portion 304 can be substantially formed of the nanostructured material, such as in the case of an electroformed design.

Advantageously, the use of the nanostructured material within the shaft portion 304 allows the sports article 300 to exhibit improved performance characteristics while being formed in a cost-effective manner. Thus, for example, high strength-to-weight ratio of the nanostructured material allows the sports article 300 to be strong yet lightweight, while high fracture toughness, high elasticity, high hardness, and high wear resistance of the nanostructured material allows the sports article 300 to be durable and to be less prone to structural damage. In addition, vibration damping and a desired sound upon impact are achieved when the nanostructured material is electro-deposited onto a suitable substrate, such as polymers or fiber-reinforced plastics (e.g., graphite/epoxy).

The use of specific materials and other specific implementation features can further enhance performance characteristics of the sports article 300. For example, an amount and a distribution of the nanostructured material can contribute to the performance characteristics of the sports article 300. In particular, it is contemplated that the nanostructured material can be distributed so as to provide sufficient coverage of the shaft portion 304, such as by extending substantially across the length $L_C$ of the shaft portion 304. As another example, the blade portion 302 can be formed of the same or a different nanostructured material, which can form at least one layer of a multi-layered design. It is also contemplated that the blade portion 302 can be substantially formed of the nanostructured material, such as in the case of an electroformed design. The use of the nanostructured material within the blade portion 302 can allow the sports article 300 to exhibit improved performance characteristics, such as a desired weight, enhanced efficiency of energy transfer upon impact, enhanced balance, enhanced durability, and enhanced coupling strength to the shaft portion 304. Also, the use of the nanostructured material within the blade portion 302 can provide desired feel and sound upon impact.

Implementations of Sports Articles

The foregoing provides a general overview of some embodiments of the invention. Attention next turns to FIG. 4, which illustrates a cross-sectional view of a portion 400 of a sports article, according to an embodiment of the invention. For example, the portion 400 can be a cap portion, a barrel portion, a tapered portion, a handle portion, a knob portion, or an insert of a sports bat. As another example, the portion 400 can be a head portion or a handle portion of a lacrosse stick. As a further example, the portion 400 can be a blade portion or a shaft portion of a hockey stick.

Figure 4:
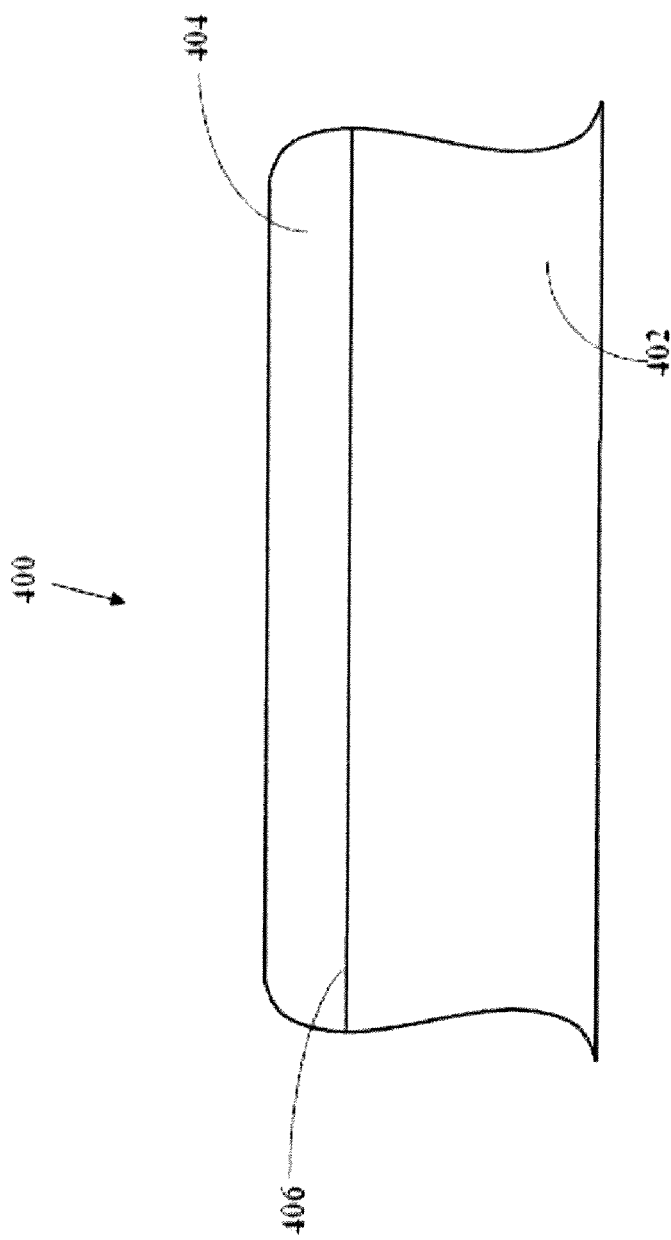
FIG. 4 illustrates a cross-sectional view of a portion of a sports article, according to an embodiment of the invention.

As illustrated in FIG. 4, the portion 400 is implemented in accordance with a multi-layered design and includes a first layer 402 and a second layer 404 that is adjacent to the first layer 402. In the illustrated embodiment, the second layer 404 is formed adjacent to the first layer 402 via electrodeposition. However, it is contemplated that the second layer 404 can be formed using any other suitable manufacturing technique.

In the illustrated embodiment, the first layer 402 is implemented as a substrate and is formed of any suitable material, such as a fibrous material, a foam, a ceramic, a metal, a metal alloy, a polymer, or a composite. Thus, for example, the first layer 402 can be formed of wood; an aluminum alloy, such as a 6000-series aluminum alloy or a 7000-series aluminum alloy; a steel alloy; a scandium alloy; a thermoplastic or thermoset polymer, such as a copolymer of acrylonitrile, butadiene, and styrene; a carbon/epoxy composite, such as a graphite fiber/epoxy composite; a fiberglass/epoxy composite; a poly-paraphenylene terephthalamide fiber/epoxy composite, such as a Kevlar® brand fiber/epoxy composite, where Kevlar® brand fibers are available from DuPont Inc., Wilmington, Del.; or a polyethylene fiber/epoxy composite, such as a Spectra® brand fiber/epoxy composite, where Spectra® brand fibers are available from Honeywell International Inc., Morristown, N.J. The selection of a material forming the first layer 402 can be dependent upon a variety of considerations, such as its ability to facilitate formation of the second layer 404, its ability to be molded or shaped into a desired form, and desired characteristics of the portion 400.

While not illustrated in FIG. 4, it is contemplated that the first layer 402 can be formed so as to include two or more sub-layers, which can be formed of the same material or different materials. For certain implementations, at least one of the sub-layers can be formed of a conductive material, such as in the form of a coating of a metal. As can be appreciated, such implementation of the first layer 402 can be referred to as a "metallized" form of the first layer 402. The conductive material can be deposited using any suitable manufacturing technique, such as metallization in an organic or inorganic bath, aerosol spraying, electroless deposition, chemical vapor deposition, physical vapor deposition, or any other suitable coating or printing technique. Such metallized form can be desirable, since the conductive material can facilitate formation of the second layer 404 as well as provide enhanced durability and strength to the portion 400.

As illustrated in FIG. 4, the second layer 404 is implemented as a coating and is formed of a nanostructured material. Thus, for example, the second layer 404 can be formed of n-Ni, n-Ni Co, n-Ni Fe, n-Co P, n-Ni P, n-Cu, n-Zn, n-Zn Ni, n-Zn Fe, n-Ag, n-Au, n-Pt, n-Fe, or a composite thereof, such as a $B_4C$/n-Ni P composite, a $MoS_2$/n-Fe composite, or a carbon nanotube/n-Ni Fe composite. The selection of the nanostructured material can be dependent upon a variety of considerations, such as desired characteristics of the portion 400.

During use, the second layer 404 can be positioned so that it is exposed to an outside environment, thus serving as an outer coating. It is also contemplated that the second layer 404 can be positioned so that it is adjacent to an internal compartment, thus serving as an inner coating. Referring to FIG. 4, the second layer 404 at least partly covers a surface 406 of the first layer 402. Depending on characteristics of the first layer 402 or a specific manufacturing technique used, the second layer 404 can extend below the surface 406 and at least partly permeate the first layer 402. While two layers are illustrated in FIG. 4, it is contemplated that the portion 400 can include more or less layers for other implementations. In particular, it is contemplated that the portion 400 can include a third layer (not illustrated in FIG. 4) that is formed of the same or a different nanostructured material. It is also contemplated that the portion 400 can be implemented in accordance with an electroformed design, such that the first layer 402 serves as a temporary substrate during formation of the second layer 404. Subsequent to the formation of the second layer 404, the first layer 402 can be separated using any suitable manufacturing technique.

Depending upon specific characteristics desired for the portion 400, the second layer 404 can cover from about 1 to about 100 percent of the surface 406 of the first layer 402. Thus, for example, the second layer 404 can cover from about 20 to about 100 percent, from about 50 to about 100 percent, or from about 80 to about 100 percent of the surface 406. When mechanical characteristics of the portion 400 are a controlling consideration, the second layer 404 can cover a larger percentage of the surface 406. On the other hand, when other characteristics of the portion 400 are a controlling consideration, the second layer 404 can cover a smaller percentage of the surface 406. Alternatively, or in conjunction, when balancing mechanical and other characteristics of the portion 400, it can be desirable to adjust a thickness of the second layer 404.

In some instances, the second layer 404 can have a thickness that is in the range from about 10 μm to about 5 cm. Thus, for example, the second layer 404 can have a thickness that is at least about 10 μm, such as at least about 25 μm or at least about 30 μm, and up to about 5 mm, such as up to about 400 μm or up to about 100 μm. In other instances, the second layer 404 can have a thickness to grain size ratio that is in the range from about 6 to about 25,000,000. Thus, for example, the second layer 404 can have a thickness to grain size ratio that is at least about 25, such as at least about 100 or at least about 1,000, and up to about 12,500,000, such as up to about 1,250,000, up to about 100,000, or up to about 10,000. When mechanical characteristics of the portion 400 are a controlling consideration, the second layer 404 can have a greater thickness or a larger thickness to grain size ratio. On the other hand, when other characteristics of the portion 400 are a controlling consideration, the second layer 404 can have a smaller thickness or a smaller thickness to grain size ratio. Alternatively, or in conjunction, when balancing mechanical and other characteristics of the portion 400, it can be desirable to adjust a percentage of the surface 406 that is covered by the second layer 404.

For certain implementations, the second layer 404 can represent from about 1 to about 100 percent of a total weight of the portion 400. Thus, for example, the second layer 404 can represent at least about 5 percent of the total weight, such as at least about 10 percent or at least about 20 percent, and up to about 95 percent of the total weight, such as up to about 85 percent or up to about 75 percent. When mechanical characteristics of the portion 400 are a controlling consideration, the second layer 404 can represent a larger weight percentage of the portion 400. On the other hand, when other characteristics of the portion 400 are a controlling consideration, the second layer 404 can represent a lower weight percentage of the portion 400. Alternatively, or in conjunction, when balancing mechanical and other characteristics of the portion 400, it can be desirable to adjust a thickness of the second layer 404 or a percentage of the surface 406 that is covered by the second layer 404.

In some instances, the second layer 404 can be formed so as to provide substantially uniform characteristics across the surface 406 of the first layer 402. Thus, as illustrated in FIG. 4, the nanostructured material is substantially uniformly distributed across the surface 406. Such uniformity in distribution can serve to reduce or prevent the occurrence of a weak spot at or near a section of the portion 400 that includes a lesser amount of the nanostructured material than another section. However, depending upon specific characteristics desired for the portion 400, the distribution of the nanostructured material can be varied from that illustrated in FIG. 4. Thus, for example, the nanostructured material can be distributed non-linearly across the surface 406 to match a stress profile of the first layer 402 under service loads or meet a set of mass characteristics requirements, such as center of gravity, balance point, inertia, swing weight, or total mass.

During formation of the portion 400, the first layer 402 is positioned in a plating tank that includes a suitable plating solution. It is also contemplated that a plating rack, a plating barrel, a plating brush, or a plating drum can be used in place of, or in conjunction with, the plating tank. In some instances, a set of additives can be added when forming the plating solution. Next, electrical connections are formed between the first layer 402, which serves as a cathode, and at least one anode, and the second layer 404 can be deposited on the surface 406 of the first layer 402 using any suitable electrodeposition technique, such as direct current ("DC") electrodeposition, pulse electrodeposition, or some other current waveform electrodeposition. Thus, for example, the second layer 404 can be deposited by transmitting a set of direct current cathodic-current pulses between the anode and the cathode and by transmitting a set of direct current anodic-current pulses between the cathode and the anode. Transmission of the set of cathodic-current pulses can occur at a cathodic-current pulse frequency in the range from about 0 to about 1,000 Hertz ("Hz") and with a cathodic duty cycle in the range from about 5 to about 100 percent. In particular, the set of cathodic-current pulses can be transmitted at pulsed intervals during which current passes for a time period $t_{on}$ of at least about 0.1 millisecond ("msec"), such as in the range from about 0.1 to about 50 msec, and does not pass for a time period $t_{off}$ in the range from about 0 to 500 msec. Transmission of the set of anodic-current pulses can occur at intervals during which current passes for a time period $t_{anodic}$ in the range from about 0 to about 50 msec. In some instances, a resulting deposition rate can be in the range from about 10 to about 500 μm/hour ("μm/hr"). Thus, for example, the deposition rate can be at least about 25 μm/hr, such as at least about 50 μm/hr or at least about 75 μm/hr, and up to about 500 μm/hr. After the second layer 404 is formed on the surface 406, the second layer 404 can be further strengthened by applying a suitable heat treatment.

Figure 5:
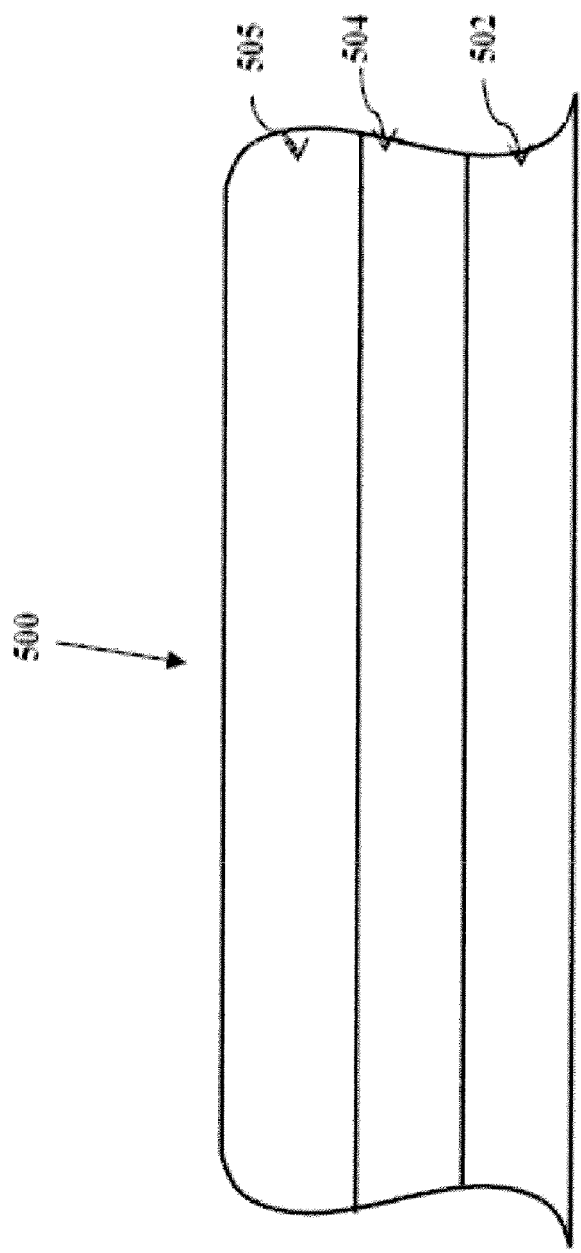
FIG. 5 illustrates a cross-sectional view of a portion of a sports article, according to another embodiment of the invention.

FIG. 5 illustrates a cross-sectional view of a portion 500 of a sports article, according to another embodiment of the invention. As illustrated in FIG. 5, the portion 500 is implemented in accordance with a multi-layered design and includes a first layer 502, a second layer 504 that is adjacent to the first layer 502, and a third layer 506 that is adjacent to the second layer 504. In particular, the portion 500 includes a laminate structure that is formed via a lay-up of the layers 502, 504, and 506, and at least one of the layers 502, 504, and 506 is formed of a nanostructured material. While three layers are illustrated in FIG. 5, it is contemplated that the portion 500 can include more or less layers for other implementations.

Referring to FIG. 5, the first layer 502 and the third layer 506 are formed of any suitable materials, such as fibrous materials, foams, ceramics, metals, metal alloys, polymers, or composites. Thus, for example, at least one of the first layer 502 and the third layer 506 can be formed of a graphite fiber/epoxy composite. As can be appreciated, a graphite fiber/epoxy composite can have any of a variety of forms, such as uniaxial, biaxial, woven, pre-impregnated, filament wound, tape-layered, or a combination thereof. The selection of materials forming the first layer 502 and the third layer 506 can be dependent upon a variety of considerations, such as their ability to facilitate formation of the second layer 504, their ability to be molded or shaped into a desired form, and desired characteristics of the portion 500.

As illustrated in FIG. 5, the second layer 504 is formed of a nanostructured material, such as n-Ni, n-Ni Co, n-Ni Fe, n-Co P, n-Ni P, n-Cu, n-Zn, n-Zn Ni, n-Zn Fe, n-Ag, n-Au, n-Pt, n-Fe, or a composite thereof. The selection of the nanostructured material can be dependent upon a variety of considerations, such as its ability to be molded or shaped into a desired form and desired characteristics of the portion 500. In the illustrated embodiment, the second layer 504 is formed as a foil, a sheet, or a plate via electrodeposition. In particular, the second layer 504 is deposited on a temporary substrate using similar electrodeposition settings as previously described with reference to FIG. 4. It is also contemplated that the second layer 504 can be formed using any other suitable manufacturing technique. The resulting second layer 504 formed of the nanostructured material can have characteristics that are similar to those previously described with reference to FIG. 4.

During formation of the portion 500, the first layer 502 serves as an inner ply to which the second layer 504 and the third layer 506 are sequentially added as a middle ply and an outer ply, respectively. Once properly positioned with respect to one another, the layers 502, 504, and 506 are coupled to one another using any suitable fastening mechanism, such as through inter-laminar shear strength of epoxy, an additional chemical adhesive paste, or an adhesive thin film added before a standard cure cycle that can optionally involve vacuum pressure. The portion 500 can be formed with a variety of shapes using hand lay-up, tape-layering, filament winding, bladder molding, or any other suitable manufacturing technique.

Figure 6:
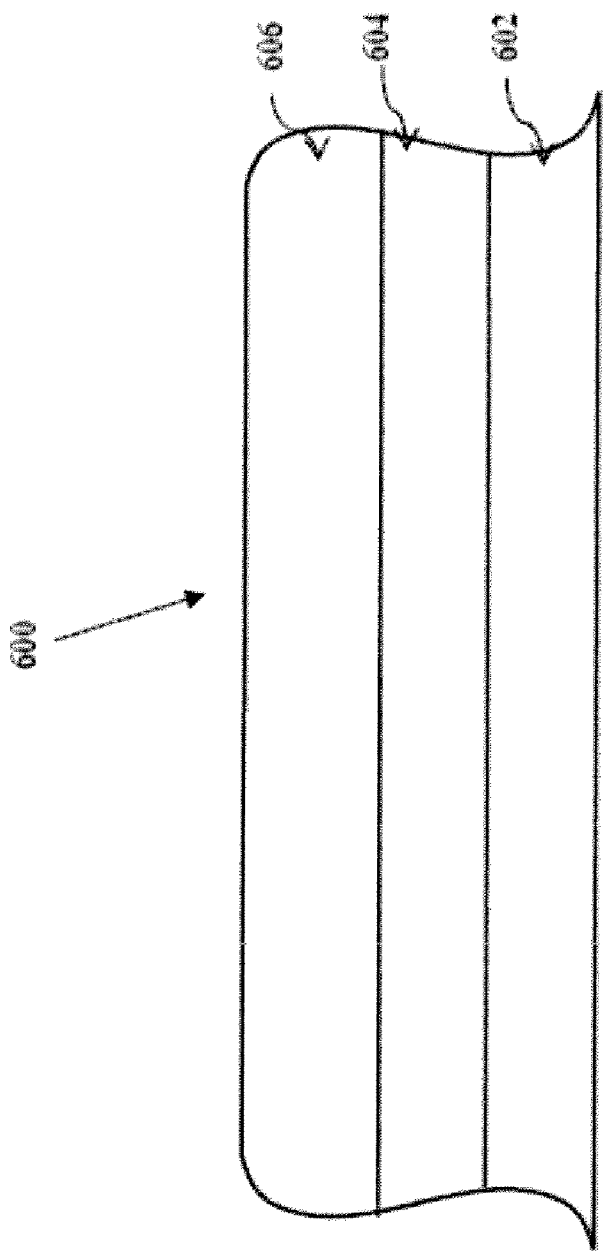
FIG. 6 illustrates a cross-sectional view of a portion of a sports article, according to a further embodiment of the invention.

FIG. 6 illustrates a cross-sectional view of a portion 600 of a sports article, according to a further embodiment of the invention. As illustrated in FIG. 6, the portion 600 is implemented in accordance with a multi-layered design and includes a first layer 602, a second layer 604 that is adjacent to the first layer 602, and a third layer 606 that is adjacent to the second layer 604. In particular, the portion 600 includes a laminate structure that is formed via a lay-up of the layers 602, 604, and 606, and at least one of the layers 602, 604, and 606 is formed of a nanostructured material. While three layers are illustrated in FIG. 6, it is contemplated that the portion 600 can include more or less layers for other implementations.

Referring to FIG. 6, the first layer 602 and the third layer 606 are formed of the same nanostructured material or different nanostructured materials. The selection of the nanostructured materials can be dependent upon a variety of considerations, such as their ability to be molded or shaped into a desired form and desired characteristics of the portion 600. In the illustrated embodiment, the first layer 602 and the third layer 606 are formed as foils, sheets, or plates using similar electrodeposition settings as previously described with reference to FIG. 4. It is also contemplated that the layers 602 and 606 can be formed using any other suitable manufacturing technique. The resulting layers 602 and 606 can have characteristics that are similar to those previously described with reference to FIG. 4.

As illustrated in FIG. 6, the second layer 604 is formed of a visco-elastic material that exhibits high vibration damping. The selection of the visco-elastic material can be dependent upon a variety of other considerations, such as its ability to be molded or shaped into a desired form. An example of the visco-elastic material is a visco-elastic polymer that is based on polyether and polyurethane, such as Sorbothane® brand polymers that are available from Sorbothane, Inc., Kent, Ohio. Advantageously, the use of the visco-elastic material allows the second layer 604 to serve as a constrained, vibration damping layer, thus reducing vibrations and providing a desired feel upon impact.

During formation of the portion 600, the first layer 602 serves as an inner ply to which the second layer 604 and the third layer 606 are sequentially added as a middle ply and an outer ply, respectively. Once properly positioned with respect to one another, the layers 602, 604, and 606 are coupled to one another using any suitable fastening mechanism, such as though inter-laminar shear strength of epoxy, an additional chemical adhesive paste, or an adhesive thin film added before a standard cure cycle that can optionally involve vacuum pressure. The portion 600 can be formed with a variety of shapes using hand lay-up, tape-layering, filament winding, bladder molding, or any other suitable manufacturing technique.

EXAMPLES

The following examples describe specific features of some embodiments of the invention to illustrate and provide a description for those of ordinary skill in the art. The examples should not be construed as limiting the invention, as the examples merely provide specific methodology useful in understanding and practicing some embodiments of the invention.

Example 1

Mechanical Characteristics of Nanostructured Materials

Measurements of mechanical characteristics of six different materials were made in accordance with standard protocols. Two of these materials are steel-based materials, namely Maraging Steel (Carpenter 465) and Steel 17-4 PH, while three of these materials are titanium-based materials, namely Ti 6Al-4V (Grade 5), β-Titanium (15-3-3-3), and SP-700 Ti. The remaining material is a nanostructured material, namely n-Ni Fe (20). n-Ni Fe (20) has an average grain size of about 20 nm and a composition of about 80 percent by weight of Ni and about 20 percent by weight of Fe. n-Ni Fe (20) is available from PowerMetal Technologies Inc., Carlsbad, Calif.

Specifically, an electrolyte composition included a modified Watts bath for nickel containing 300 g/l nickel sulfate, 45 g/l nickel chloride, 45 g/l boric acid ($H_3BO_3$), 2 g/l saccharin, and 3 ml/l NPA-91. To form n-Ni Fe (20), 12 g/l $FeCl_2.H_2O$, 81 g/l $FeSO_4.7H_2O$, and 9 g/l Na-Citrate are added to the modified Watts bath. Standard levelers and brighteners were employed. Inco nickel "R"-rounds and electrolytic iron-chips were used as anode material. n-Ni Fe (20) was deposited using DC (100% duty cycle) at a current density of about 100 $mA/cm^2$ and a temperature of about 60° C.

Referring to Table 2 below, results of the measurements are shown. As can be appreciated with reference to Table 2, n-Ni Fe (20) has a number of mechanical characteristics that render it desirable for sports applications, including a relatively high strength (e.g., in terms of yield strength), a relatively high strength-to-weight ratio (e.g., in terms of specific strength), a relatively high resilience (e.g., in terms of modulus of resilience), a relatively high elasticity (e.g., in terms of elastic limit), a relatively high hardness, a relatively high ductility (e.g., in terms of tensile strain-to-failure), and a relatively high wear resistance (e.g., in terms of Taber Wear Index). Indeed, as compared with the steel-based materials and the titanium-based materials that were tested, n-Ni Fe (20) exhibited the greatest resilience, which can translate into an enhanced Coefficient of Restitution when implemented in sports articles such as baseball bats, softball bats, and golf clubs.

TABLE 2

|  | Maraging Steel (Carpenter 465) | Steel 17-4 PH | Ti 6Al-4V (Grade 5) | β-Titanium (15-3-3-3) | SP-700 Ti | n-Ni Fe (20) |
| --- | --- | --- | --- | --- | --- | --- |
| Density, $g/cm^3$ | 7.8 | 7.8 | 4.4 | 4.7 | 4.5 | 8.3 |
| Young's Modulus, GPa (Msi) | 200 (29.0) | 198 (28.6) | 114 (16.5) | 103 (15.0) | 110 (16.0) | 185 (26.9) |
| Specific Modulus, $GPa/g/cm^3$ | 25.6 | 25.4 | 25.9 | 21.9 | 24.4 | 22.3 |
| Yield Strength, MPa (ksi) | 1655 (240) | 870 (126) | 790 (115) | 1000 (145) | 970 (141) | 1785 (260) |
| Specific Strength, $MPa/g/cm^3$ | 212 | 111 | 179 | 213 | 865 | 215 |

TABLE 2-continued

|  | Maraging Steel (Carpenter 465) | Steel 17-4 PH | Ti 6Al-4V (Grade 5) | β-Titanium (15-3-3-3) | SP-700 Ti | n-Ni Fe (20) |
| --- | --- | --- | --- | --- | --- | --- |
| Modulus of Resilience, psi | 993 | 278 | 401 | 701 | 621 | 1258 |
| Elastic Limit, % of original shape | 0.83 | 0.44 | 0.69 | 0.97 | 0.88 | 0.90 |
| Hardness, Vickers | 530 | 325 | 340 | 370 | 291 | 600 |
| Tensile Strain to Failure, % elongation | N/A | 6.0% | 15% | 7.0% | 19% | >5% |
| Taber Wear Index, CS-17) | N/A | N/A | N/A | N/A | N/A | 35 |

Example 2

Sports Articles Formed Using Nanostructured Materials

Table 3 below provides examples of sports articles and nanostructured materials that can be used to form these sports articles.

TABLE 3

| Sports Articles | Nanostructured Materials |
| --- | --- |
| golf face plates | n-Ni, n-Ni Co, n-Ni Fe, n-Co P, n-Ni P, and composites thereof |
| golf iron inserts | n-Ni, n-Ni Co, n-Ni Fe, n-Co P, n-Ni P, n-Cu, n-Zn, n-Zn Ni, n-Zn Fe, and composites thereof |
| golf putter inserts | n-Ni, n-Ni Co, n-Ni Fe, n-Co P, n-Ni P, n-Cu, n-Zn, n-Zn Ni, n-Zn Fe, and composites thereof |
| golf wedge inserts | n-Ni, n-Ni Co, n-Ni Fe, n-Co P, n-Ni P, n-Cu, n-Zn, n-Zn Ni, n-Zn Fe, and composites thereof |
| golf shafts | n-Ni, n-Ni Co, n-Ni Fe, n-Co P, n-Ni P, and composites of n-Ni P |
| baseball bats and softball bats | n-Ni, n-Ni Co, n-Ni Fe, n-Co P, n-Ni P, and composites thereof |
| lacrosse sticks | n-Ni, n-Ni Co, n-Ni Fe, n-Co P, n-Ni P, and composites thereof |
| hockey sticks | n-Ni, n-Ni Co, n-Ni Fe, n-Co P, n-Ni P, and composites thereof |
| hockey skate frames | n-Ni, n-Ni Co, n-Ni Fe, n-Co P, n-Ni P, and composites thereof |
| tennis rackets, squash rackets, racquetball rackets, and paddle ball racquets | n-Ni, n-Ni Co, n-Ni Fe, n-Co P, n-Ni P, and composites thereof |
| yacht masks and sailing booms | n-Ni, n-Ni Co and n-Ni Fe |
| fishing reels and tackles | n-Ni, n-Ni Co, n-Ni Fe, n-Co P, n-Ni P, and composites thereof |
| alpine and cross-country skis | n-Ni, n-Ni Co, n-Ni Fe, n-Co P, n-Ni P, and composites thereof |
| water skis | n-Ni, n-Ni Co, n-Ni Fe, n-Co P, n-Ni P, and composites of n-Ni P |
| skiing and hiking poles | n-Ni, n-Ni Co, n-Ni Fe, n-Co P, n-Ni P, and composites thereof |
| hiking and climbing gear | n-Ni, n-Ni Co, n-Ni Fe, n-Co P, n-Ni P, and composites thereof |

TABLE 3-continued

| Sports Articles | Nanostructured Materials |
| --- | --- |
| mountaineering gear | n-Ni, n-Ni Co, n-Ni Fe, n-Co P, n-Ni P, n-Zn, n-Zn Ni, n-Zn Fe, and composites thereof |
| archery broadheads | n-Ni, n-Ni Co, n-Ni Fe, n-Co P, n-Ni P, and composites thereof |
| archery shafts | n-Ni, n-Ni Co, n-Ni Fe, n-Co P, n-Ni P, and composites thereof |
| diving tanks and regulators | n-Ni, n-Ni Co, n-Ni Fe, n-Co P, n-Ni P, n-Zn, n-Zn Ni, n-Zn Fe, and composites thereof |
| bicycle frames | n-Ni, n-Ni Co, n-Ni Fe, n-Co P, n-Ni P, n-Zn, n-Zn Ni, n-Zn Fe, and composites thereof |
| bicycle seat posts | n-Ni, n-Ni Co, n-Ni Fe, n-Co P, n-Ni P, n-Zn, n-Zn Ni, n-Zn Fe, and composites thereof |
| bicycle linkage systems | n-Ni, n-Ni Co, n-Ni Fe, n-Co P, n-Ni P, n-Zn, n-Zn Ni, n-Zn Fe, and composites thereof |
| bicycle handle bars | n-Ni, n-Ni Co, n-Ni Fe, n-Co P, n-Ni P, n-Zn, n-Zn Ni, n-Zn Fe, and composites thereof |
| bicycle drive chains | n-Ni, n-Ni Co, n-Ni Fe, n-Co P, n-Ni P, n-Zn, n-Zn Ni, n-Zn Fe, and composites thereof |
| bicycle front forks | n-Ni, n-Ni Co, n-Ni Fe, n-Co P, n-Ni P, n-Zn, n-Zn Ni, n-Zn Fe, and composites thereof |
| bicycle disk brakes | n-Ni, n-Ni Co, n-Ni Fe, n-Co P, n-Ni P, n-Zn, n-Zn Ni, n-Zn Fe, and composites thereof |
| bicycle wheels | n-Ni, n-Ni Co, n-Ni Fe, n-Co P, n-Ni P, n-Zn, n-Zn Ni, n-Zn Fe, and composites thereof |
| bicycle spokes | n-Ni, n-Ni Co, n-Ni Fe, n-Co P, n-Ni P, n-Zn, n-Zn Ni, n-Zn Fe, and composites thereof |
| helmets | n-Ni, n-Ni Co, n-Ni Fe, n-Co P, n-Ni P, n-Zn, n-Zn Ni, n-Zn Fe, and composites of n-Ni P |
| gloves | n-Ni, n-Ni Co, n-Ni Fe, n-Co P, n-Ni P, and composites of n-Ni P |
| shin guards | n-Ni, n-Ni Co, n-Ni Fe, n-Co P, n-Ni P, and composites of n-Ni P |
| elbow pads | n-Ni, n-Ni Co, n-Ni Fe, n-Co P, n-Ni P, and composites of n-Ni P |
| shoulder pads | n-Ni, n-Ni Co, n-Ni Fe, n-Co P, n-Ni P, and composites of n-Ni P |
| face masks | n-Ni, n-Ni Co, n-Ni Fe, n-Co P, n-Ni P, and composites of n-Ni P |

Example 3

Electroformed Sports Article/Fine-Grained Alloy—Golf Shaft

According to an embodiment of the invention, it is desirable to produce fine-grained sports articles by electroplating without the use of a permanent substrate. In this case, a fine-grained metallic material is electroformed on a suitable temporary cathode or mandrel, which is removed from the article in a suitable manner, such as mechanically, thermally (e.g., melting of, for example, a wax-based temporary substrate), or dissolution (e.g., chemically dissolving, for example, Al, Cu, or the like substrates).

To demonstrate the production of an electroformed article, a freestanding golf club shaft comprised entirely of fine-grained, n-Ni Mo (Mo content≦2%) was electroformed on a Cr-plated steel mandrel ($OD_1$=0.600 inches, tapering down to $OD_2$=0.335 inches over a length of 42 inches) in a modified Watts nickel bath and using a Dynatronix (www.dynatronix.com, Dynanet PDPR 40-100-400) pulse power supply. An electrolyte used comprised 300 g/l nickel sulfate, 45 g/l nickel chloride, 45 g/l boric acid, 4 g/l sodium molybdate, 2 g/l saccharin, and 5 ml/l NPA-91 (www.atotechUSA.com supplied wetting agent). Standard levelers, brighteners, stress relievers, and chelating agents were employed, and nickel "R"-rounds (www.inco.com) were used as an anode material. The electroplating conditions and metallic layer properties used are summarized in Table 4.

TABLE 4

| Electroplating Conditions | |
| --- | --- |
| Deposition Temperature [° C.] | 62 |
| Duty Cycle [%] | 30 |
| Deposition Rate [µm/hr] | 75 |
| Average Coating Thickness: [µm] | 325 |
| Average Grain Size: [µm] | 0.035 |
| Ratio Coating Thickness/Grain Size | 9,286 |
| Yield Strength [MPa] | 1035 |
| Hardness [Vickers] | 540 |

The electroformed n-Ni Mo shaft was removed from the temporary substrate. Due to the partial shielding of the anodes, the shaft wall thickness increased from about 300 µm at the handle ($OD_1$) to about 380 µm at the tip ($OD_2$). This particular shaft, a graphite shaft, and a steel shaft of similar weight were equipped with Pro Steel #4 Iron heads and submitted to Golf Laboratory Inc. (www.golflabs.com) for computer controlled robotic performance testing. Six individual measurements were taken for each test condition. Table 5 illustrates that the average ball dispersion and distance characteristics of the electroformed shaft are improved when compared to both graphite and steel shafts (e.g., higher lift angle, higher ball velocity, and reduced ball spin rate). Particularly noteworthy is the substantial improvement in ball dispersion for "off center hits."

Other parts composed of fine-grained nickel, cobalt, or iron based alloys with different geometries, including tubes, plates, and the like, were also successfully formed using the same process.

Off-the-shelf Penley Graphite Light LS S-Flex and Penley G2-85 X-Flex graphite shafts were used. The S-Flex shafts were characterized, stripped of the paint, and subsequently plated with coarse and fine-grained coatings. Plated S-Flex

TABLE 5

Golf Club Robotic Test Results

| Shaft Description | GRAPHITE, UST ProForce 95 'S' Flex | STEEL-STD, 'S' Flex | n-Ni Mo shaft | GRAPHITE, UST ProForce 95 'S' Flex | STEEL-STD, 'S' Flex | n-Ni Mo shaft | GRAPHITE, UST ProForce 95 'S' Flex | STEEL-STD, 'S' Flex | n-Ni Mo shaft |
|---|---|---|---|---|---|---|---|---|---|
| | Center Hits | | | ½" Toe Hits | | | ½" Heel Hits | | |
| Carry Distance [m] | 161.7 | 164.6 | 164.9 | 158.4 | 158.8 | 161.7 | 163.2 | 165.7 | 166.0 |
| Carry Dispersion [m] | 1.16 | 0.94 | 1.25 | 5.54 | 3.29 | 1.71 | 4.63 | 6.00 | 1.71 |
| Total Distance [m] | 168.2 | 169.8 | 176.8 | 164.3 | 165.5 | 168.1 | 170.4 | 172.4 | 173.6 |
| Total Dispersion [m] | 1.74 | 1.37 | 1.62 | 5.94 | 3.51 | 2.07 | 4.51 | 6.80 | 2.16 |
| Ball Velocity [km/h] | 139.4 | 139.7 | 140.8 | 134.3 | 134.7 | 135.7 | 138.0 | 138.5 | 138.6 |
| Head Velocity [km/h] | 144.0 | 144.8 | 146.1 | 144.4 | 145.3 | 146.1 | 144.8 | 146.0 | 146.6 |
| Spin [rpm] | 5456 | 5412 | 5301 | 5390 | 5500 | 5526 | 5097 | 5180 | 5308 |
| Lift Angle [°] | 18.8 | 19.5 | 20.1 | 18.7 | 19.3 | 19.7 | 18.7 | 18.5 | 19.9 |
| Lift Height [m] | 38.8 | 40.5 | 41.9 | 35.7 | 37.1 | 38.6 | 37.2 | 39.2 | 40.2 |

Example 4 n-Ni Coated Graphite Composite—Golf Shaft

Various non-metallic materials are commonly used in the manufacture of sports articles, including golf club shafts, hockey sticks, lacrosse sticks, baseball bats, and the like. These materials typically include polymeric resin matrix composites employing materials including carbon fibers, ceramic matrix, aramid fibers, polyethylene fibers, boron, fiberglass, and various thermoplastics including, but not limited to, polypropylene, polyethylene, polystyrene, vinyls, acrylics, nylon, and polycarbonates.

Graphite fiber weaves or felts embedded in a polymer matrix (e.g., epoxy) are particularly suited substrates for numerous sports articles. To demonstrate the fabrication of coated articles, hybrid metal/polymer golf shafts were prepared using a "permanent" graphite-containing substrate. This approach allows a combination of the favorable properties of fine-grained materials with the favorable properties of graphite/epoxies, thus leading to products with new properties and usually improved performance characteristics at reduced weight when compared to conventional all graphite/epoxy or conventional all metal parts. As a variety of articles can be rendered suitable for electroplating by applying a thin layer of a conductive material (e.g., by electroless deposition, physical or chemical vapor deposition, or applying electrically conductive paints by various suitable means), it should be understood that embodiments of the invention encompass the use of virtually any substrate material, which need not be electrically conductive.

shafts and unplated X Flex shafts having a total overall weight of 89 g were performance tested. Ni sleeves were applied to the outside of the S-Flex graphite golf club shafts ($OD_1$=0.586 inches, tapering down to $OD_2$=0.368 inches over a length of 40.5 inches) by electrodeposition in a modified Watts nickel bath and using a Dynatronix (Dynanet PDPR 20-30-100) pulse power supply. The starting mass of each S-Flex shaft was 71.5 g, and, prior to electroplating, approximately 6.0 g of paint was stripped off. The coating procedure comprised: (1) applying a thin electroless nickel plating to enhance the electrical conductivity using a procedure and chemicals provided by MacDermid Industrial Products (www.macindustrialproducts.com) to achieve an average metal film thickness of 0.4 μm at a deposition rate of 1.7 μm/hr; and (2) electroplating to form the fine-grained or coarse-grained coating by varying the duty cycle and the peak current density. The electrolyte composition and plating set up used were similar to that described in Example 3. The weight of the metal coating was approximately 20 g. The electroplating conditions and metallic layer properties used are summarized in Table 6.

TABLE 6

Electroplating Conditions

| | Fine-Grained | Coarse-Grained |
|---|---|---|
| Deposition Temperature [° C.] | 60 | 60 |
| Duty Cycle [%] | 25 | 100 |
| Deposition Rate [m/hr] | 50 | 8.6 |
| Average Coating Thickness: [μm] | 55 | 58 |
| Average Grain Size: [μm] | 0.025 | 10 |

TABLE 6-continued

Electroplating Conditions

| | Fine-Grained | Coarse-Grained |
|---|---|---|
| Ratio Coating Thickness/Grain Size | 2,200 | 5.8 |
| Yield Strength [MPa] | 900 | 276 |
| Hardness [Vickers] | 580 | 140 |

Flexural stiffness was measured with a GolfSmith Frequency Analyzer, and the frequency was converted to a FlexRating (S=stiff, X=extra stiff). The torque values were determined using a GolfSmith Torque Arm with 1 ft.lb torque at 2 inches from the tip end of the shaft. The data are summarized in Table 7 and indicate that a significant improvement in the torque values can be obtained by replacing some fraction of the original weight of a graphite shaft with an electrodeposited coating, while maintaining the overall total weight.

Professional golfers also tested these golf clubs. The feedback received suggested that the clubs formed with an electrodeposited coating exhibited a superior feel and a superior performance when compared to conventional graphite or steel shafts. Compared to graphite shafts, the ball trajectory was reported to more consistent, as expected from the significantly improved torque value measurements.

Similar performance benefits were achieved when forming other coated articles, such as fishing rods, hockey sticks, baseball bats, lacrosse sticks, tennis racquets, and bicycle parts (e.g., forks and frames). Selected samples were chromium-plated to a thickness of less than about 20 μm using conventional chromium plating technology or painted to enhance appearance or corrosion resistance. These aesthetic finishes were not observed to change the mechanical properties to any significant degree.

TABLE 7

Comparison of Golf Shaft Properties

| Shaft Characteristics | Standard Graphite Shaft | Fine Grained | Coarse Grained |
|---|---|---|---|
| Graphite Shaft Weight Before Coating [g] | 88.5 | 71.6 | 71.8 |
| Deflection Before Coating | X | S | S |
| Torque Before Coating [°] | 4.4 | 5.4 | 5.1 |
| Plating weight [g] | N/A | 19.2 | 20.0 |
| Total weight [g] | 88.5 | 88.8 | 89.8 |
| Deflection After Coating | X | X | X |
| Torque After Coating [°] | 4.4 | 3.6 | 4.0 |

Example 5 n-Ni Coated Graphite Composite—Golf Shaft

Example 4 illustrates the benefit of relatively thin, fine-grained metallic coatings with a thickness greater than 25 μm and a fine-grained metal content of about 22% of the total weight. To investigate the effect of further increasing metal content, hybrid graphite/metal golf shafts were prepared and characterized. True Temper Prolaunch (A-Flex) driver graphite shafts were coated with fine-grained metallic nickel layers of varying weights. The process and the characterization techniques employed were similar to that described in Example 4. Table 8 shows the torsional stiffness as a function of the metal content of graphite/metal composite golf shafts. The data reveal that the torsional stiffness per unit weight of an article containing a metallic coating representing 5% of the total weight is improved by at least about 5% when compared to the torsional stiffness of the same article not containing the metallic coating. Further improvements in the torsional stiffness are obtained when the relative metal content is further increased at a rate of approximately one percent improvement in torsional stiffness per percent relative metal content.

The torque and deflection data indicate that a significant performance improvement can be obtained by increasing the relative metal weight of the composite graphite/metal shafts. Graphite/metal composite golf shafts incorporating a metallic coating representing at least 5% of the total weight, such as more than 10% or more than 20%, provide a substantial improvement over the performance of uncoated graphite shafts. Similar performance benefits were achieved when forming other coated articles, such as fishing rods, hockey sticks, baseball bats, lacrosse sticks, tennis racquets, bicycle frames, and the like.

TABLE 8

Torsional Stiffness Comparison of Shafts

| Metal Content of Hybrid Shaft [Weight %] | Relative Change in Torsional Stiffness per Unit Weight [% per degree/kg] |
|---|---|
| 0 | 0 |
| 25 | 30 |
| 43 | 55 |
| 55 | 70 |
| 68 | 83 |
| 75 | 95 |

Example 6

Faceplate—n-Ni on Steel

A 1 mm thick mild steel faceplate as used in golf club heads was covered with a fine-grained metallic layer using a conventional tank electroplating cell setup and the Watts bath similar to that described in Example 4 in order to deposit a 0.4 mm thick layer of fine-grained n-Ni on one surface. The n-Ni-layer surface was polished to a "mirror finish" ultimately using a 1 μm diamond paste. Subsequently, a 0.4 mm thick layer of conventional coarse-grained Ni was prepared similarly as described in Example 4. The two samples were suitably mounted on a horizontal plate, and a steel ball (3 mm diameter) was dropped from a height of 60 cm onto the samples. The rebound height was determined to be 2.9 mm for the conventional Ni layer, while the rebound height of the n-Ni sample was determined to be 28.8 mm. The rebound height off the n-Ni sample improved by a factor of approximately 10, as expected based on the approximately 10 fold improvement in resilience as shown in Table 9.

TABLE 9

Electroplating Conditions

| | Fine-grained | Coarse-grained |
|---|---|---|
| Average Coating Thickness: [μm] | 400 | 400 |
| Average Grain Size: [μm] | 0.025 | 20 |
| Ratio Coating Thickness/Grain Size | 16,000 | 20 |
| Deposition Rate [μm/hr] | 45 | 18 |
| Duty Cycle [%] | 25 | 100 |
| Deposition Temperature [° C.] | 60 | 60 |
| Yield Strength [MPa] | 900 | 276 |
| Resilience, MPa | 1.93 | 0.18 |

TABLE 9-continued

| Electroplating Conditions | Fine-grained | Coarse-grained |
|---|---|---|
| Rebound height [cm] | 28.8 | 2.9 |
| Improvement in Rebound Height [%] | 893 | 0 |

Example 7

Faceplate Coating—Metal Matrix Composite on Polyurethane Substrate

A nanocrystalline Co—$TiO_2$ composite of 0.12 mm average coating thickness was deposited onto a number of polyurethane golf head faceplates using a modified Watts bath for cobalt, a soluble anode made of electrolytic cobalt pieces, and a Dynatronix (Dynanet PDPR 20-30-100) pulse power supply. The electrolyte used comprised 300 g/l cobalt sulfate, 45 g/l cobalt chloride, 45 g/l boric acid, 2 g/l saccharin, and 4 ml/l NPA-91. Suspended in the bath were 0-500 g/l titania (or $TiO_2$) particles (<1 μm particle size) with the aid of 0-12 g/l Niklad™ particle dispersant (MacDermid Inc.). The electroplating conditions and metallic layer properties are summarized in Table 10. Prior to electroplating, polyurethane substrate surfaces were mechanically abraded using Scotch-Brite® followed by metallizing using commercial silver spraying.

TABLE 10

| Electroplating Conditions | |
|---|---|
| Deposition Temperature [° C.] | 60 |
| Duty Cycle [%] | 25 |
| Deposition Rate [μm/hr] | 40 |
| Average Coating Thickness: [μm] | 120 |
| Average Grain Size: [μm] | 0.015 |
| Ratio Coating Thickness/Grain Size | 8,000 |

In order to achieve fine-grained coatings, a series of coated samples were produced using the modified Watts bath with the addition of $TiO_2$ particles (particle size<1 μm) ranging from 50 g/l to 500 g/l. Table 11 illustrates the properties of the deposits.

TABLE 11

Co—$TiO_2$ composite properties

| Sample | Bath Concentration $TiO_2$ [g/l] | Bath Concentration Dispersant [g/l] | Grain Size of Co deposit [nm] | $TiO_2$ Fraction in Deposit [Volume %] | Microhardness [Vickers] |
|---|---|---|---|---|---|
| Control | 0 | 0 | 16 | 0 | 490 |
| 1 | 50 | 0 | 15 | 19 | 507 |
| 2 | 100 | 1.5 | 15 | 23 | 521 |
| 3 | 200 | 3 | 17 | 32 | 531 |
| 4 | 300 | 6 | 17 | 38 | 534 |
| 5 | 500 | 12 | 16 | 37 | 541 |

Example 8

Faceplate Coating—n-Ni P

A faceplate of a mild-steel golf club head was coated using a selective plating unit supplied by Sifco Selective Plating (www.brushplating.com). A DC power supply was employed. Standard substrate cleaning and activation procedures provided by Sifco Selective Plating were used. Using the anode brush with manual operation, a 50 μm thick n-Ni P (~0.6 wt % P, average grain size: 13 nm, 780 Vickers) layer was deposited onto the face plate area of about 3 square inches. The electrolyte used comprised 137 g/l nickel sulfate, 36 g/l nickel carbonate, 4 g/l phosphorous acid, and 2 g/l saccharin. Inco nickel "R"-rounds were used as an anode material. The electroplating conditions and metallic layer properties used are summarized in Table 12. After plating, the faceplate was heat-treated to further enhance the mechanical properties by precipitation hardening.

TABLE 12

| Electroplating Conditions | |
|---|---|
| Deposition Temperature [° C.] | 65 |
| Duty Cycle [%] | 100 |
| Deposition Rate [μm/hr] | 50 |
| Average Coating Thickness: [μm] | 50 |
| Average Grain Size: [μm] | 0.013 |
| Ratio Coating Thickness/Grain Size | 3,846 |
| Hardness [Vickers] | 780 |
| Hardness after Heat Treatment (400° C./20 min) [Vickers] | 890 |
| Hardness after Heat Treatment (400° C./20 min + 200° C./11 hrs) [Vickers] | 1,010 |

Example 9

Arrow Shafts—n-Ni Fe on Graphite/Epoxy

Over time, archery arrows progressed from being made out of wood to aluminum. Aluminum arrows are typically lighter than wood arrows, but, with repeated use, aluminum arrows tend to bend, causing inconsistent trajectories and loss of accuracy. More recently, graphite-composite arrows are being made from carbon fibers/polyvinyl or polyester resins. Graphite composite arrows are typically lighter and tougher than aluminum, and they typically have a lesser tendency to bend when striking a hard object. The lighter weight can lead to increased speed, resulting in delivering higher kinetic energy on impacting the target. Graphite composite arrows, however, can also have a number of limitations. For example, these arrows can have a tendency to oscillate along the shaft, causing inaccuracies in flight and reduced penetration after hitting a target. Due to their relatively limited "spine weight" and their low stiffness, it can be difficult to use these arrows with bows with more than 50 lb draw weight. Furthermore, upon penetrating the target, a friction that is generated can heat up a tip section of the shaft to a temperature of over about 150° C. to 200° C. This temperature can be significantly above the maximum temperature the graphite fiber/epoxy composite is able to withstand, resulting in degradation of the graphite fiber/epoxy composite shaft, deterioration of its performance, and ultimately failure of the shaft.

Carbon-epoxy/fiberglass test shafts (30 inches) were reinforced with an outer layer (thickness: 0.004 inches) of a fine-grained n-Ni Fe (20). The fine-grained reinforcement layer extended all the way up the length of the base shaft, thus making the shaft more resistant to impacts. The enhanced thermal conductivity serves to distribute the heat of friction generated upon impacting the target over a larger surface, thereby reducing the maximum temperature that the graphite fiber/epoxy composite is exposed to and increasing durability. A similar deposition procedure for a modified Watts bath for n-Ni Fe (20) was followed for coating the arrow shafts with an average grain size of 20 nm. Specifically, the n-Ni Fe (20) coating was prepared from a conventional Watts baths using the plating conditions similar to that described in Example 1, and the Fe concentration was maintained by adding $FeCl_2.H_2O$ (12 g/l), $FeSO_4.7H_2O$ (81 g/l), and Na-Citrate (9 g/l) solution to the Watts bath electrolyte. A shaft to be plated was abraded and metallized by silver spraying to render it suitable for plating, and a fine-grained n-Ni Fe (20) layer (average grain size of 20 nm) was plated onto the outer surface. Test samples were prepared with the fine-grained n-Ni Fe (20) layer representing between 10% and 80% of the total arrow weight. The shafts were fitted with field tips, nocks, and suitable vanes and submitted to tests using a compound bow with a draw weight of 60 lb. Overall, the arrows containing the fine-grained metallic coating consistently outperformed the uncoated arrows. Samples with a fine-grained metal layer of at least 5% of the total weight of the arrow displayed a performance superior to that of conventional graphite fiber/epoxy and aluminum arrow shafts.

Example 10 n-Ni Fe Coated Baseball Bat

To demonstrate the benefits of baseball bats reinforced with a nanostructured material, off-the-shelf aluminum baseball bats (weight~1-1.5 lb) were obtained. After suitable activation (e.g., surface roughened with Scotch-Brite® in order to enhance coating adhesion), each bat was masked in areas that were not to be plated and subjected to a standard chemical aluminum activation procedure. In particular, body portions of the bats, including barrel portions, tapered portions, and handle portions, were coated with n-Ni Fe (20) according to a plating procedure similar to that described in Example 1. Outer surfaces were coated to a thickness of 0.003 inches to enhance the strength without significantly increasing the weight. The total weight of the nanostructured material coating ranged from 50 g to 55 g. In addition, a polymeric surface coating was applied to the nanostructured material coating of selected samples to enhance the appearance and sound quality of the baseball bats.

The nanostructured material coated bats passed standard peel tests and were exposed to a variety of mechanical and playability tests. The results indicated that the thickness and weight of the aluminum substrate could be substantially reduced if the nanostructured coating was applied. Hybrid nanostructured material/aluminum baseball bats made with thinner and lighter aluminum formers provided adequate durability and performance even though the overall weight of the bats was reduced by 15% to 50%. Similar performance benefits can also be achieved with baseball bats and other sports articles, such as bowling pins and the like, that include substrates formed of carbon/epoxy, wood and acrylonitrile butadiene styrene ("ABS"), polyamide, and polypropylene.

It should be appreciated that the embodiments of the invention described above are provided by way of example, and various other embodiments are contemplated. For example, while some embodiments of the invention have been described with reference to sports articles, it is contemplated that other types of articles can be implemented in a similar manner as described herein.

A practitioner of ordinary skill in the art requires no additional explanation in developing the embodiments described herein but may nevertheless find some helpful guidance regarding characteristics and formation of nanostructured materials by examining the patent application of Palumbo et al., U.S. patent application Ser. No. 11/013,456, entitled "Strong, Lightweight Article Containing a Fine-Grained Metallic Layer" and filed on Dec. 17, 2004, and the patent application of Palumbo et al., U.S. patent application Ser. No. 10/516,300, entitled "Process for Electroplating Metallic and Metal Matrix Composite Foils, Coatings and Microcomponents" and filed on Dec. 9, 2004, the disclosures of which are incorporated herein by reference in their entirety.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A golf club head, comprising:
a substrate including at least one of a fibrous material, a foam, a ceramic, a metal, a metal alloy, a polymer, and a composite; and
a structural coating coupled to the substrate and including an electrodeposited fine-grained binary Ni—Fe alloy, the electrodeposited fine-grained metallic material having an average grain size that is in the range of 2 nm to 5000 nm, a yield strength that is in the range of 200 MPa to 2,750 MPa, and a hardness that is in the range of 100 Vickers to 2,000 Vickers, the structural coating having a thickness in the range of 30 μm to 5,000 μm, such that the electrodeposited fine-grained metallic material represents at least 10 percent of a total weight of the golf club head.

2. The golf club head claim 1, wherein the electrodeposited fine-grained material represents at least 10 percent of the total weight of the golf club head and up to 95 percent of the total weight of the golf club head.

3. The golf club head of claim 1, wherein the electrodeposited fine-grained metallic material represents at least 20 percent of the total weight of the golf club head and up to 95 percent of the total weight of the golf club head.

4. The golf club head of claim 1, wherein the substrate includes a metalized layer, and the electrodeposited fine-grained metallic material is adjacent to the metalized layer.

5. The golf club head of claim 1, wherein the yield strength of the electrodeposited fine-grained metallic material is in the range of 1,500 MPa to 2,750 MPa.

6. The golf club head of claim 1, wherein the hardness of the electrodeposited fine-grained metallic material is in the range of 500 Vickers to 1,000 Vickers.

7. The sports article of claim 1, wherein the electrodeposited fine-grained metallic material has an ultimate tensile strength that is in the range of 1,000 MPa to 2,000 MPa.

8. A golf club head, comprising:
a portion including
a first layer configured as a permanent substrate; and
a second layer coupled to the first layer and having a thickness that is in the range of 30 μm to 5000 μm, the second layer representing at least 10 percent of a total weight of the portion and including a fine-grained binary Ni—Fe alloy, the fine-grained binary Ni—Fe alloy material having an average grain size that is in the range of 2 nm to 5000 nm.

9. The golf club head of claim 8, wherein the Ni—Fe includes about 80 percent by weight of Ni and about 20 percent by weight of Fe.

10. The golf club head of claim 8, wherein the first layer defines an internal compartment of the portion, and the second layer is a fine-grained inner coating adjacent to the first layer.

11. The golf club head of claim 8, wherein the average grain size of the fine-grained material is in the range of 2 nm to 750 nm.

12. The golf club head of claim 8, wherein the fine-grained metallic material has a modulus of resilience that is at least 0.25 MPa.

13. The golf club head of claim 8, wherein the fine-grained metallic material has an elastic limit that is at least 0.75 percent.

14. The golf club head of claim 8, wherein the fine-grained metallic material has a tensile strain-to-failure that is at least 3 percent.

15. The golf club head of claim 8, wherein the permanent substrate includes at least one of a fibrous material, a foam, a ceramic, a metal, a metal alloy, a polymer, and a composite, and the second layer is an electrodeposited coating coupled to the permanent substrate and including the fine-grained material.

16. The golf club head of claim 8, wherein the fine-grained metallic material has a yield strength that is in the range of 200 MPa to 2,750 MPa.

17. The golf club head of claim 16, wherein the fine-grained metallic material has a hardness that is in the range of 100 Vickers to 2,000 Vickers.

* * * * *